(12) United States Patent
Nishimoto et al.

(10) Patent No.: US 11,181,993 B2
(45) Date of Patent: Nov. 23, 2021

(54) OPERATION KNOB DEVICE

(71) Applicants: Japan Display Inc., Tokyo (JP);
U-Shin Ltd., Nagano (JP)

(72) Inventors: Takuya Nishimoto, Tokyo (JP); Nobuo Tsubokura, Tokyo (JP); Kaoru Taketa, Tokyo (JP); Kenji Ito, Hiroshima (JP)

(73) Assignees: JAPAN DISPLAY LTD., Tokyo (JP);
U-SHIN LTD., Nagano (JP)

( * ) Notice: Subject to any disclaimer, the term of this patent is extended or adjusted under 35 U.S.C. 154(b) by 0 days.

(21) Appl. No.: 17/204,393

(22) Filed: Mar. 17, 2021

(65) Prior Publication Data
US 2021/0303083 A1 Sep. 30, 2021

(30) Foreign Application Priority Data

Mar. 30, 2020 (JP) .............................. JP2020-059299

(51) Int. Cl.
*G06F 3/0362* (2013.01)
*G06F 3/038* (2013.01)
*B60K 35/00* (2006.01)

(52) U.S. Cl.
CPC ............ *G06F 3/0362* (2013.01); *B60K 35/00* (2013.01); *G06F 3/038* (2013.01); *B60K 2370/126* (2019.05); *B60K 2370/152* (2019.05)

(58) Field of Classification Search
CPC ....... G06F 3/0362; G06F 3/038; B60K 35/00; B60K 2370/126
See application file for complete search history.

(56) References Cited

U.S. PATENT DOCUMENTS

| 5,841,428 A * | 11/1998 | Jaeger | G02F 1/1345 345/184 |
| 2004/0222980 A1* | 11/2004 | Lee | H01H 19/005 345/184 |
| 2008/0129707 A1* | 6/2008 | Pryor | G06F 3/0425 345/175 |
| 2009/0064809 A1* | 3/2009 | Miret | G01D 5/2412 74/1 OR |
| 2010/0020042 A1* | 1/2010 | Stelandre | G06F 3/046 345/174 |

(Continued)

FOREIGN PATENT DOCUMENTS

WO 2015/174092 11/2015

*Primary Examiner* — Ariel A Balaoing
(74) *Attorney, Agent, or Firm* — Wenderoth, Lind & Ponack, L.L.P.

(57) ABSTRACT

An operation knob device includes a holder arranged adjacent to a display panel, a rotor arranged in a holding portion so as to allow rotation around an axis, a knob for which relative movement in a direction along the axis with respect to the rotor is allowed and relative movement in a circumferential direction around the axis is restricted, a conductive transmission member arranged on a first end side of the rotor. The transmission member includes a first transmission member that moves along the axis in conjunction with the knob, a second transmission member that is attached to the first end so as to rotate integrally with the rotor, and a connecting member that conductively connects the first transmission member and the second transmission member.

12 Claims, 14 Drawing Sheets

(56) References Cited

U.S. PATENT DOCUMENTS

| | | | |
|---|---|---|---|
| 2010/0214213 A1* | 8/2010 | Bowden | B60K 37/06 345/157 |
| 2014/0350784 A1* | 11/2014 | Imai | G06F 3/041 701/36 |
| 2016/0064167 A1* | 3/2016 | Lyszus | H03K 17/9622 200/336 |
| 2016/0176292 A1* | 6/2016 | Blaesing | G05G 5/03 335/219 |
| 2017/0052617 A1* | 2/2017 | Okuzumi | B60R 16/02 |
| 2017/0182890 A1* | 6/2017 | Ruemelin | G06F 3/04847 |
| 2018/0154774 A1* | 6/2018 | Park | G02B 27/0101 |
| 2019/0391671 A1* | 12/2019 | Pfau | G06F 3/038 |

* cited by examiner

OPERATION KNOB DEVICE

BACKGROUND OF THE INVENTION

Technical Field

The present invention relates to an operation knob device.

Description of Related Art

For an in-vehicle product such as a navigation device or a center display, a display panel having a capacitive touch detection function is employed. Since it is necessary to put a finger on a defined operation area of a display panel having no unevenness when operating an in-vehicle product, and the user needs to visually confirm the position of the operation area.

WO 2015/174092 discloses an operation knob device arranged on the surface of a display panel. The operation knob device includes a holder fixed to the display panel, a push-type button, and a rotary knob. The display panel can detect the push operation of a button as the capacitance of the display panel is changed due to the approach of a transmission member in the button. The display panel can detect the rotation operation of the knob as the position where the capacitance changes is moved by the transmission member in the knob. Since the operation knob device protrudes from the display panel, the user can operate the in-vehicle product without looking at the display panel.

SUMMARY OF THE INVENTION

In the operation knob device of WO 2015/174092, since a partition wall of the resin holder is interposed between the transmission member and the display panel, the change in the capacitance of the display panel due to the transmission member is small. Therefore, there is room for improvement in the operation knob device of WO 2015/174092 regarding the detectability of the operation by the display panel, that is, the transmissibility of the operation by the transmission member.

An object of the present invention is to provide an operation knob device in which the transmissibility of push operation and rotation operation can be improved.

According to an aspect of the present invention, there is provided an operation knob device including a holder having an annular holding portion and arranged adjacent to a display panel so that an axis of the holding portion intersect with the display panel, a rotor that has a first end facing the display panel and a second end located on a side opposite to the display panel with respect to the first end, and is arranged in the holding portion so as to allow rotation around the axis, a knob arranged on a side of the second end of the rotor so that relative movement in a direction along the axis with respect to the rotor is allowed and relative movement in a circumferential direction around the axis with respect to the rotor is restricted, and a conductive transmission member arranged on a side of the first end of the rotor. The transmission member has a first transmission portion that moves along the axis in conjunction with the knob, a second transmission portion that is attached to the first end so as to rotate integrally with the rotor and projects further than the first transmission portion with respect to the first end with the knob in a non-operated state, and a connecting portion that conductively connects the first transmission portion and the second transmission portion.

Since the first transmission portion and the second transmission portion are conductively connected, their capacitance can be made large. Specifically, when the display panel detects the first transmission portion, the capacitance of the first transmission portion is added with the capacitance of the second transmission portion, and when the display panel detects the second transmission portion, the capacitance of the second transmission portion is added with the capacitance of the first transmission portion. Therefore, it is not necessary to make the shape (volume corresponding to the capacitance) of the individual transmission members excessively large, so that the transmission members can be reduced in size. Further, since the capacitance of the transmission members can be made large, the detectability of the display panel, that is, the transmissibility of the knob operation can be improved. Furthermore, for example, even if the user wears a glove made from an insulating material, the display panel can detect the operation of the knob by the transmission members.

Specifically, when the knob is pushed, the first transmission portion arranged on the first end side of the rotor moves integrally toward the display panel. The display panel can detect the push operation of the knob as the capacitance of the display panel is changed due to the approach of the first transmission portion having conductivity. When the knob is rotated, the rotor and the second transmission portion attached to the first end side rotate integrally. The display panel can detect the rotation operation of the knob as the position where the capacitance of the display panel changes moves due to the rotation of the second transmission portion having conductivity.

In the operation knob device of the present invention, the transmissibility of the push operation and the rotation operation of the knob can be improved.

DETAILED DESCRIPTION OF EMBODIMENTS

Hereinafter, an embodiment of the present invention will be described with reference to the drawings.

First Embodiment

Figure 1:
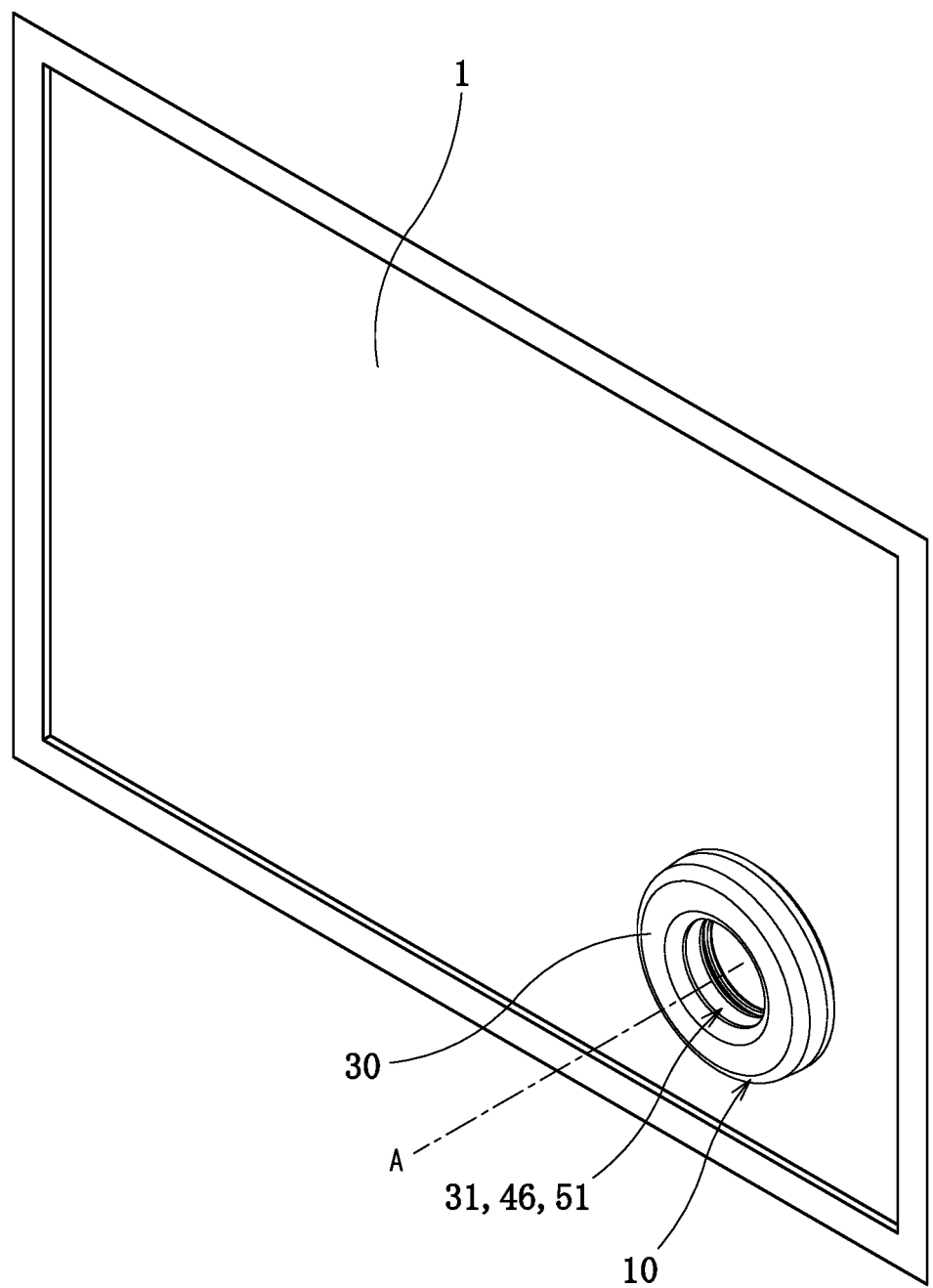
FIG. 1 is a perspective view in which an operation knob device according to an embodiment of the present invention is arranged on a display panel.
Figure 2A:
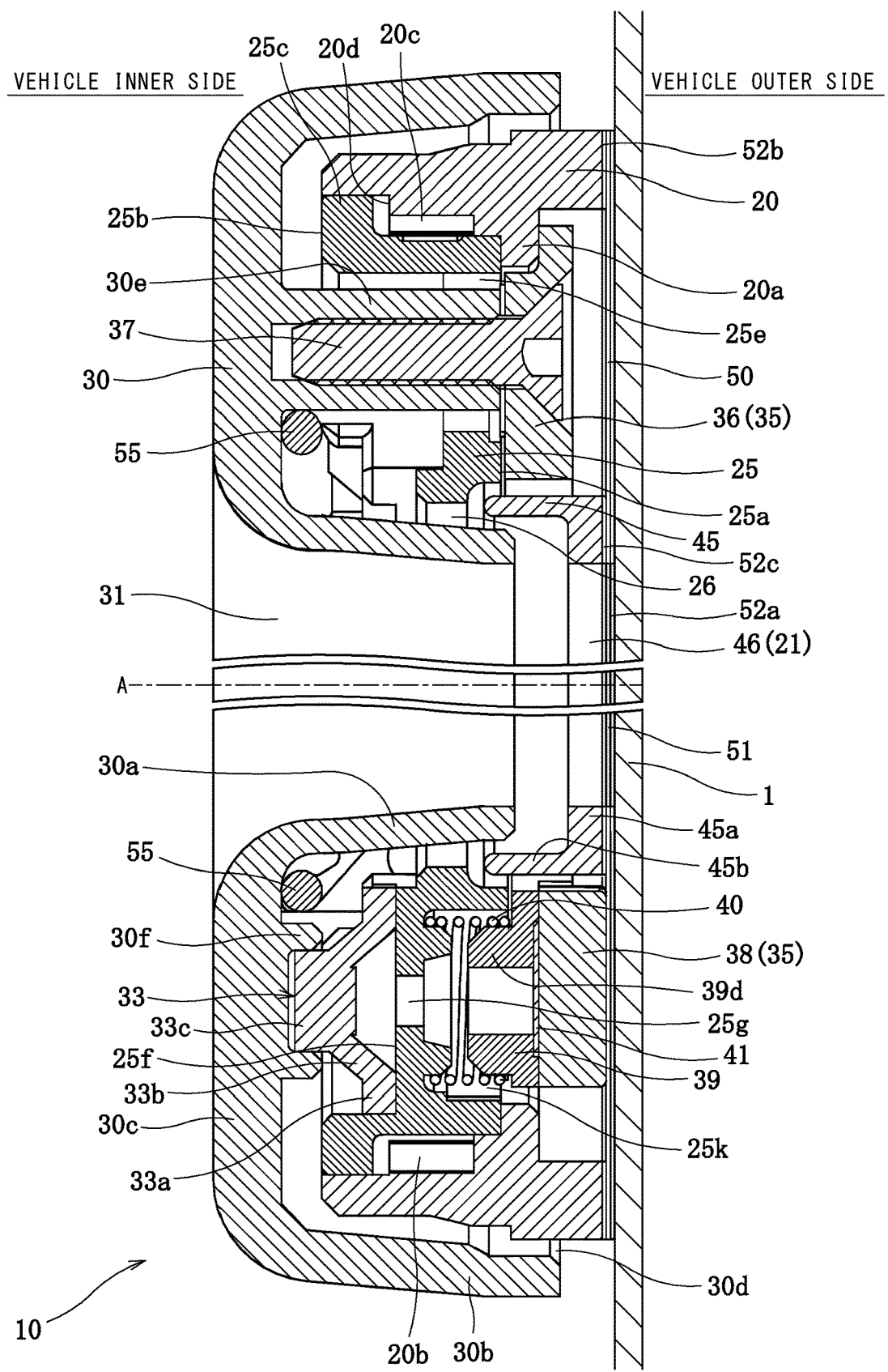
FIG. 2A is a cross-sectional view of the operation knob device of the first embodiment.

FIGS. 1 and 2A illustrate an operation knob device 10 according to a first embodiment of the present invention. A display panel 1 on which the operation knob device 10 is arranged has a touch detection function for detecting operation of the user by a change in capacitance, and is mounted on an in-vehicle product such as a navigation device or a center display.

As shown in FIG. 1, the operation knob device 10 is arranged in a defined operation area of the display panel 1 and projects from the display panel 1 to the vehicle inner side. The operation knob device 10 has an annular shape as a whole, and is arranged so that an axis A extends in the direction orthogonal to the display panel 1. The operation knob device 10 includes one knob (operation unit) 30, and transmits the push operation and rotation operation of the knob 30 to the display panel 1.

Figure 3:
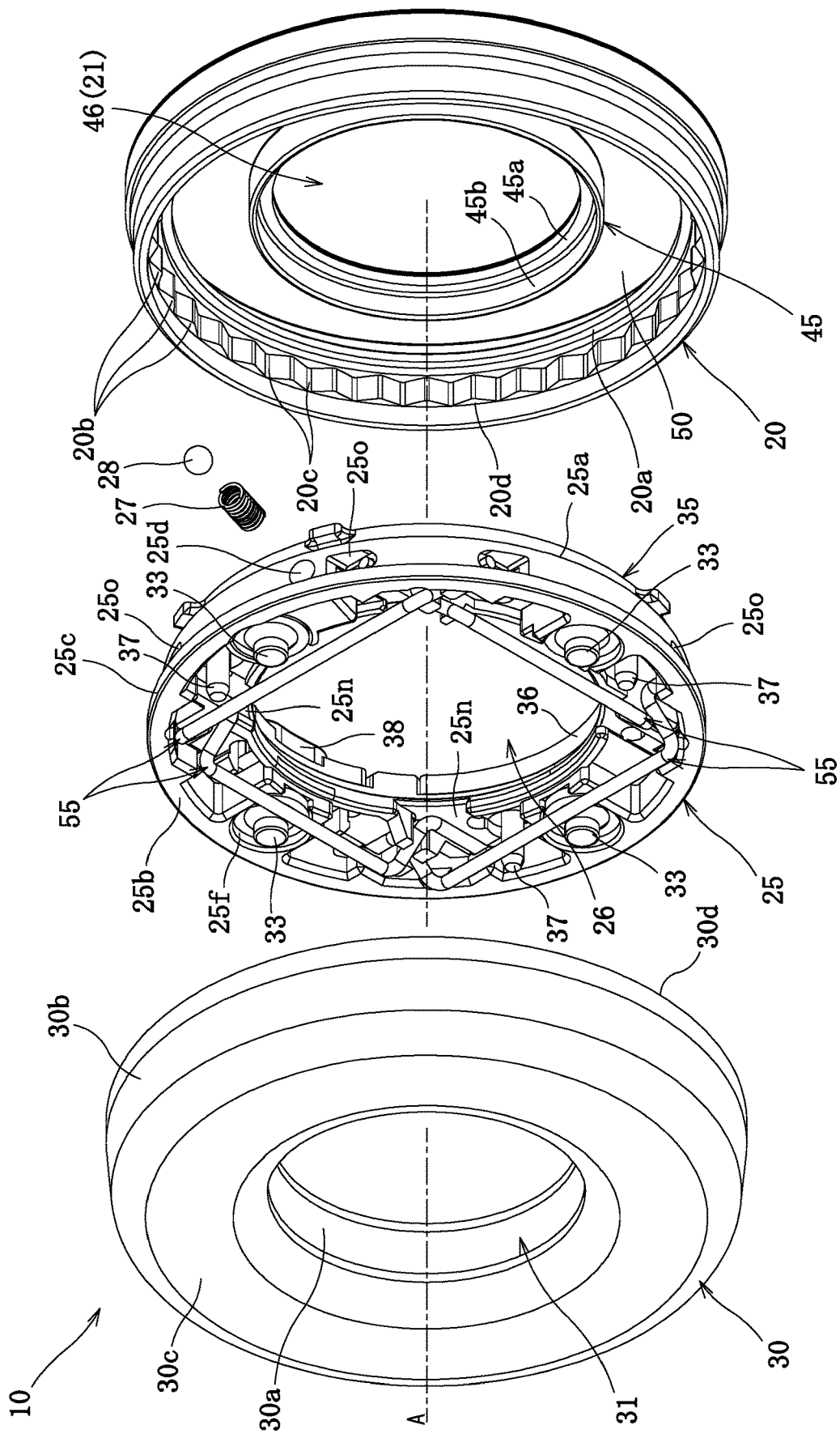
FIG. 3 is an exploded perspective view of the operation knob device of FIG. 2.

As shown in FIGS. 2A and 3, the operation knob device 10 includes a holder 20, a rotor 25, the knob 30, an energizing member 33, a transmission member 35, a ring member 45, and a film 50. The operation knob device 10 is fixed to the surface of the display panel 1 by the film 50 provided with an adhesive layer 52a. The transmission member 35 of the present embodiment includes a first transmission member 36 that transmits the push operation of the knob 30, and a second transmission member 38 that transmits the rotation operation of the knob 30.

The holder 20 and the ring member 45 are fixed to the film 50 so as to be adjacent to the display panel 1. The rotor 25 is arranged in the holder 20 so that rotation around the axis A is allowed. The knob 30 is attached to the rotor 25 so that linear movement in the direction along the axis A is allowed, and the rotor 25 is integrally rotated around the axis A. The energizing member 33 is arranged between the rotor 25 and the knob 30, and energizes the knob 30 in a direction away from the display panel 1. The first transmission member 36 is attached to the knob 30 and moves along the axis A in conjunction with the linear motion of the knob 30. The second transmission member 38 is attached to the rotor 25 and rotates integrally with the rotor 25.

Figure 2B:
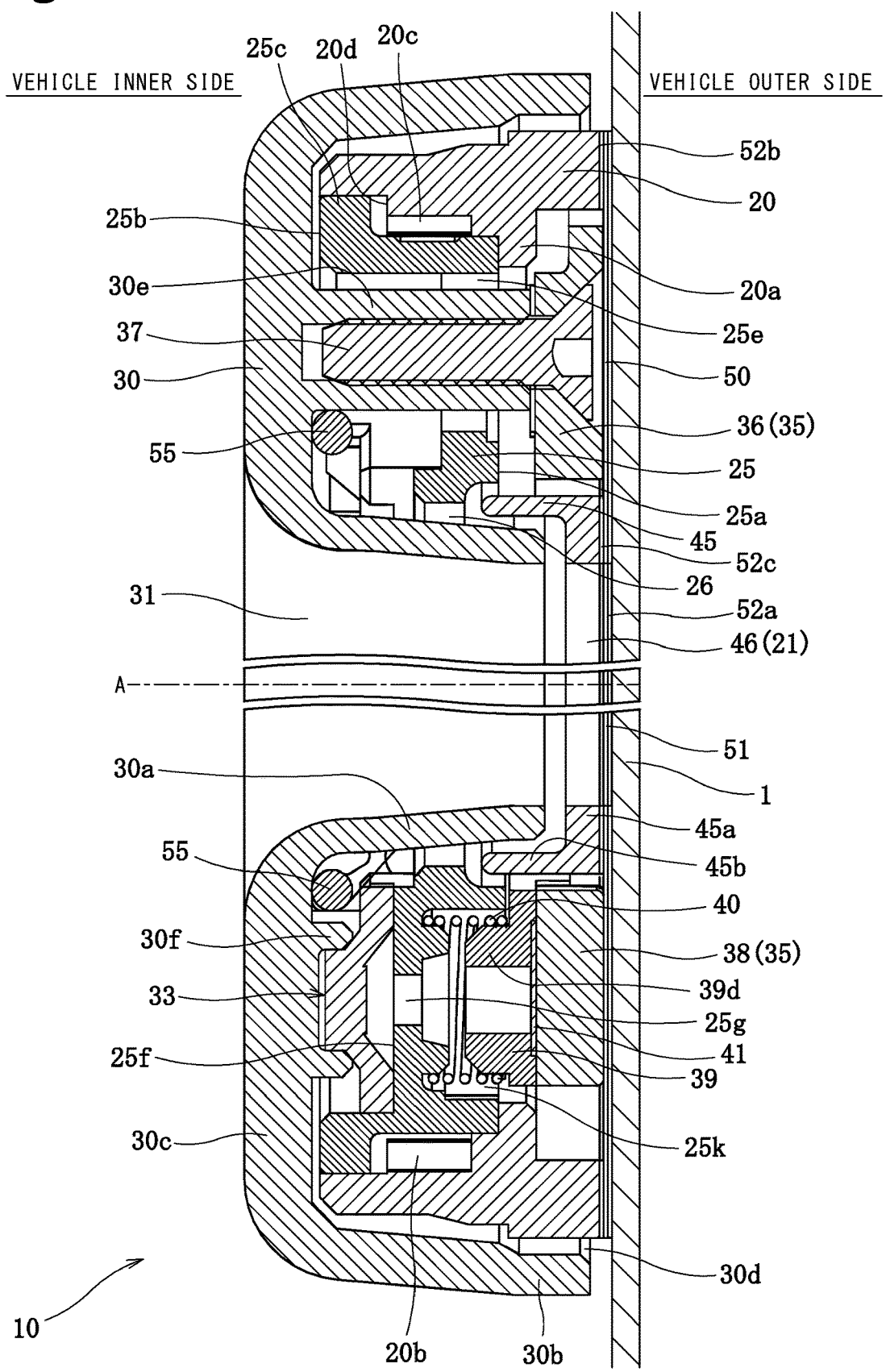
FIG. 2B is a cross-sectional view of the operation knob device for which push operation is performed.

As shown in FIG. 2B, when the knob 30 is pushed toward the display panel 1, the first transmission member 36 moves linearly toward the film 50. The display panel 1 can detect the push operation of the knob 30 as the capacitance is changed due to the approach of the first transmission member 36 having conductivity. When the hand is released from the knob 30, the knob 30 and the first transmission member 36 are moved away from the display panel 1 by the energizing member 33. The display panel 1 can detect the release of the push operation as there is no change in capacitance due to the first transmission member 36. In the push operation of the knob 30, the second transmission member 38 is kept in the state of being close to the display panel 1, and the area where the capacitance is changed by the second transmission member 38 in the display panel 1 does not change.

When the knob 30 is rotated in the state of FIG. 2A, the rotor 25 and the second transmission member 38 are integrally rotated in the same direction as the knob 30. The display panel 1 can detect the rotation operation of the knob 30 as the position where the capacitance changes moves (rotates) due to the rotation of the second transmission member 38 having conductivity. When the rotation operation is stopped, the rotation of the rotor 25 and the second transmission member 38 is also stopped. The display panel 1 can detect the stoppage of the rotation operation as the position where the capacitance changes is stopped. The display panel 1 can detect the execution, stop, or an adjustment amount of the function desired by the user by detecting a change stop position of the capacitance. In the rotation operation of the knob 30, the first transmission member 36 rotates integrally, while kept in the state of being away from the display panel 1. Accordingly, the capacitance of the display panel 1 does not change due to the first transmission member 36.

Next, a component of the operation knob device 10 will be specifically described. Note that, in the description below, the film 50 side closest to the display panel 1 may be referred to as the vehicle outer side, and an end wall portion 30c side of the knob 30 farthest from the display panel 1 may be referred to as the vehicle inner side.

Figure 4:
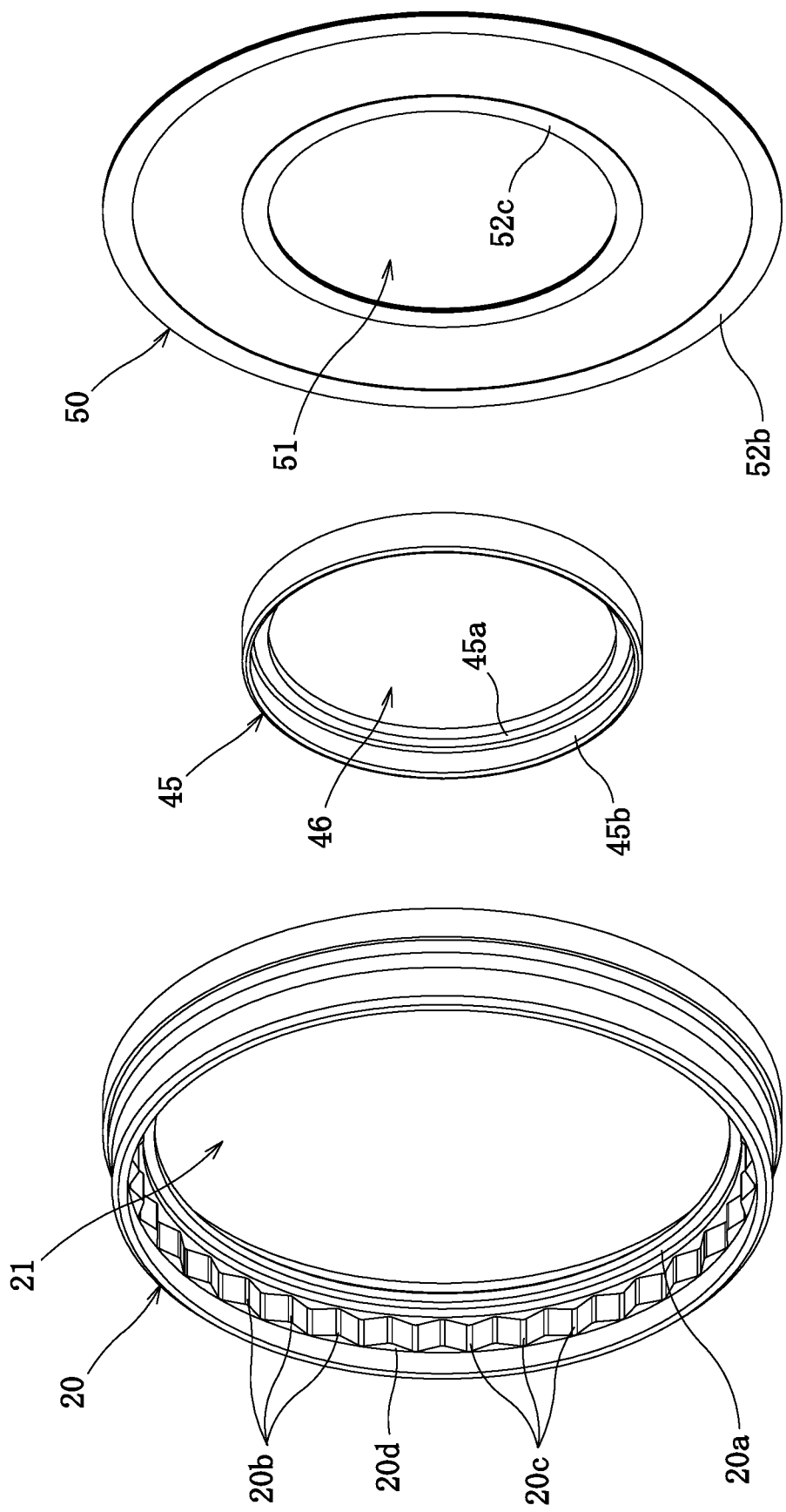
FIG. 4 is an exploded perspective view of a holder, a ring member, and a film of FIG. 3.

As shown in FIGS. 3 and 4, the holder 20 is fixed to the outer peripheral portion of the film 50 and holds other components with respect to the display panel 1. The holder 20 is made from insulating (that is, non-conductive) resin (for example, ABS). The holder 20 is an annular cylinder provided with an opening (internal space) 21 that exposes part of the display panel 1.

The inner peripheral portion of the holder 20 is provided with an annular holding portion 20a that projects inward in the radial direction, restricts the movement of the rotor 25 to the vehicle outer side along the axis A, and rotatably holds the rotor 25 around the axis A. The holder 20 is arranged on the display panel 1 so that the axis A of the holding portion 20a extends in the direction orthogonal to the display panel 1. A plurality of triangular columnar protrusions 20b protruding inward in the radial direction are arranged side by side in the circumferential direction on the inner peripheral portion of the holder 20 so as to be adjacent on the vehicle inner side to the holding portion 20a. Between the protrusions 20b adjacent to each other in the circumferential direction, an engaging groove 20c for engaging an engaging member 28 described later is formed. An end on the vehicle inner side of the protrusion 20b is located on the vehicle outer side of an end on the vehicle inner side of the holder 20, and a step portion 20d is formed by these.

Figure 5:
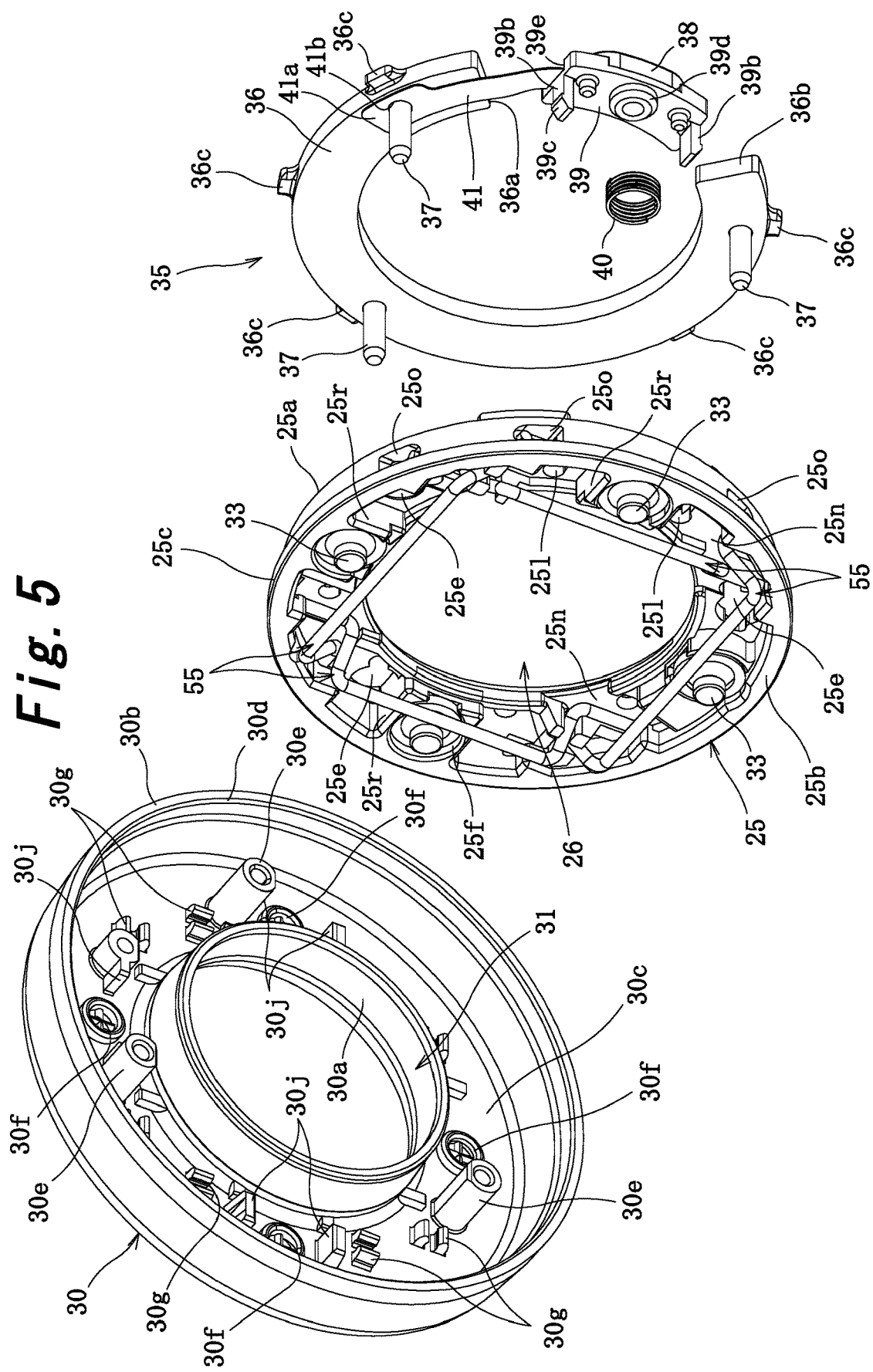
FIG. 5 is an exploded perspective view of a rotor, a first transmission member, a second transmission member, and a knob of FIG. 3.

As shown in FIGS. 3 and 5, the rotor 25 is an annular plate body around the axis A having an opening (internal space) 26 communicating with an opening 21. The rotor 25 is made from insulating resin (for example, PBT). Also referring to FIG. 2A, the rotor 25 has a first end 25a that is arranged on the vehicle outer side and faces the film 50 (display panel 1), and a second end 25*b* that is arranged on the vehicle inner side and is located on the opposite side of the film 50. As the rotor 25 is arranged in the holding portion 20*a*, the first end 25*a* abuts on the holding portion 20*a*, and the second end 25*b* is located flush with a vehicle inner side end portion of the holder 20.

The outer diameter of the rotor 25 is larger than the inner diameter of the holding portion 20*a* and smaller than the diameter of a virtual circle (not shown) connecting tips of a plurality of the protrusions 20*b*. A flange portion 25*c* that protrudes outward in the radial direction and is arranged on the step portion 20*d* of the holder 20 is provided in an end portion on the second end 25*b* side of the rotor 25. The outer diameter of the flange portion 25*c* is larger than the diameter of the virtual circle connecting tips of a plurality of the protrusions 20*b* and smaller than the inner diameter of the step portion 20*d*. In this manner, the rotor 25 can rotate around the axis A inside the holder 20.

As shown in FIG. 3, a mounting hole 25*d* formed of space having a circular cross section that is recessed inward in the radial direction is provided on the outer periphery of the rotor 25. A spring 27 and the spherical engaging member 28 are arranged in the mounting hole 25*d*. The diameter of the engaging member 28 is smaller than the diameter of the mounting hole 25*d* and larger than a groove depth in the radial direction of the engaging groove 20*c*. When the rotor 25 is rotated with respect to the holder 20, the engaging member 28 moves to the inside of the mounting hole 25*d* due to an inclined surface of the protrusion 20*b*, and contracts the spring 27. The rotor 25 is held at a predetermined rotation angle position with respect to the holder 20 as the engaging member 28 energized outward by the spring 27 is engaged with the engaging groove 20*c*.

Figure 6:
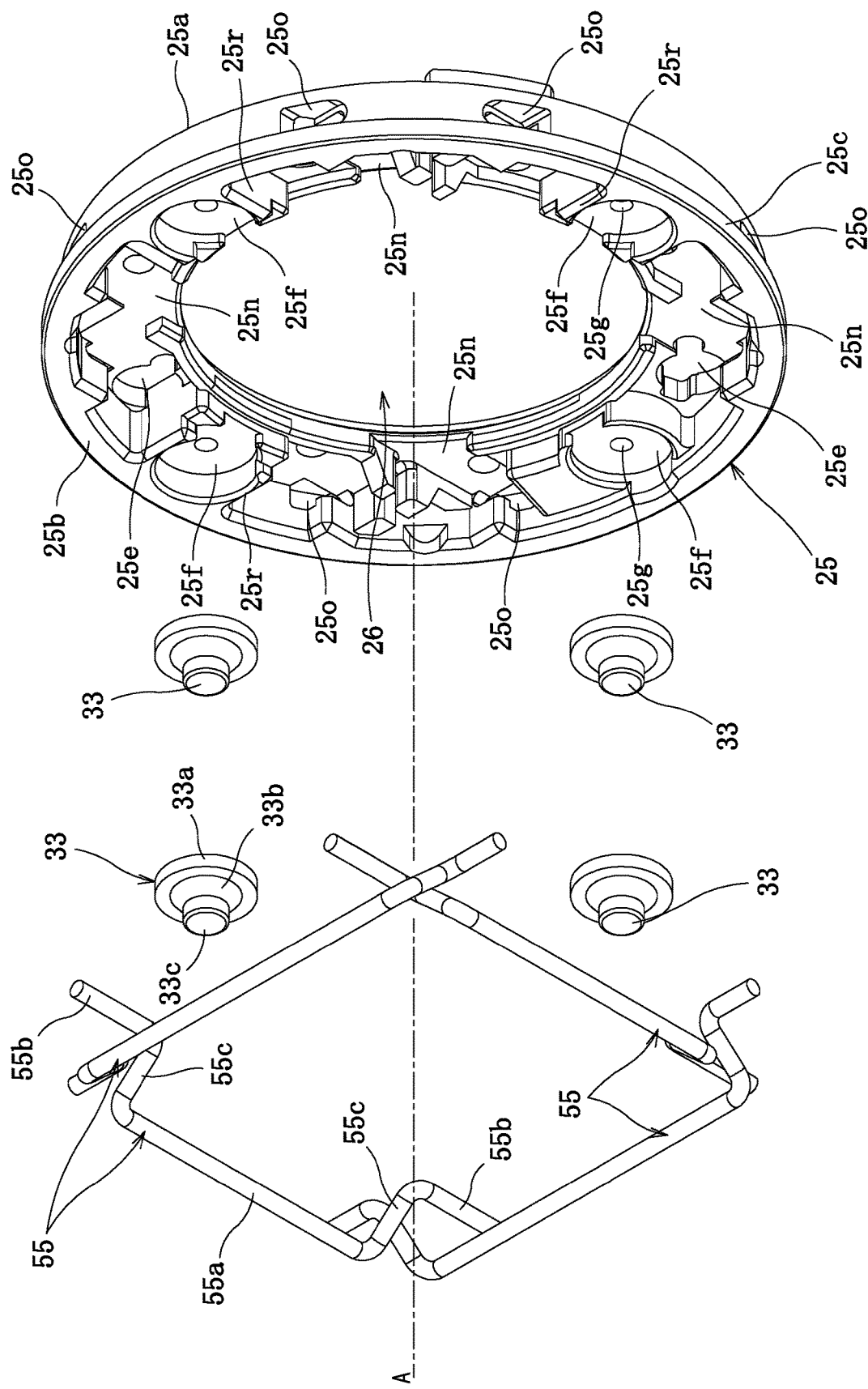
FIG. 6 is an exploded perspective view of the rotor, an energizing member, and a stabilizer.
Figure 7:
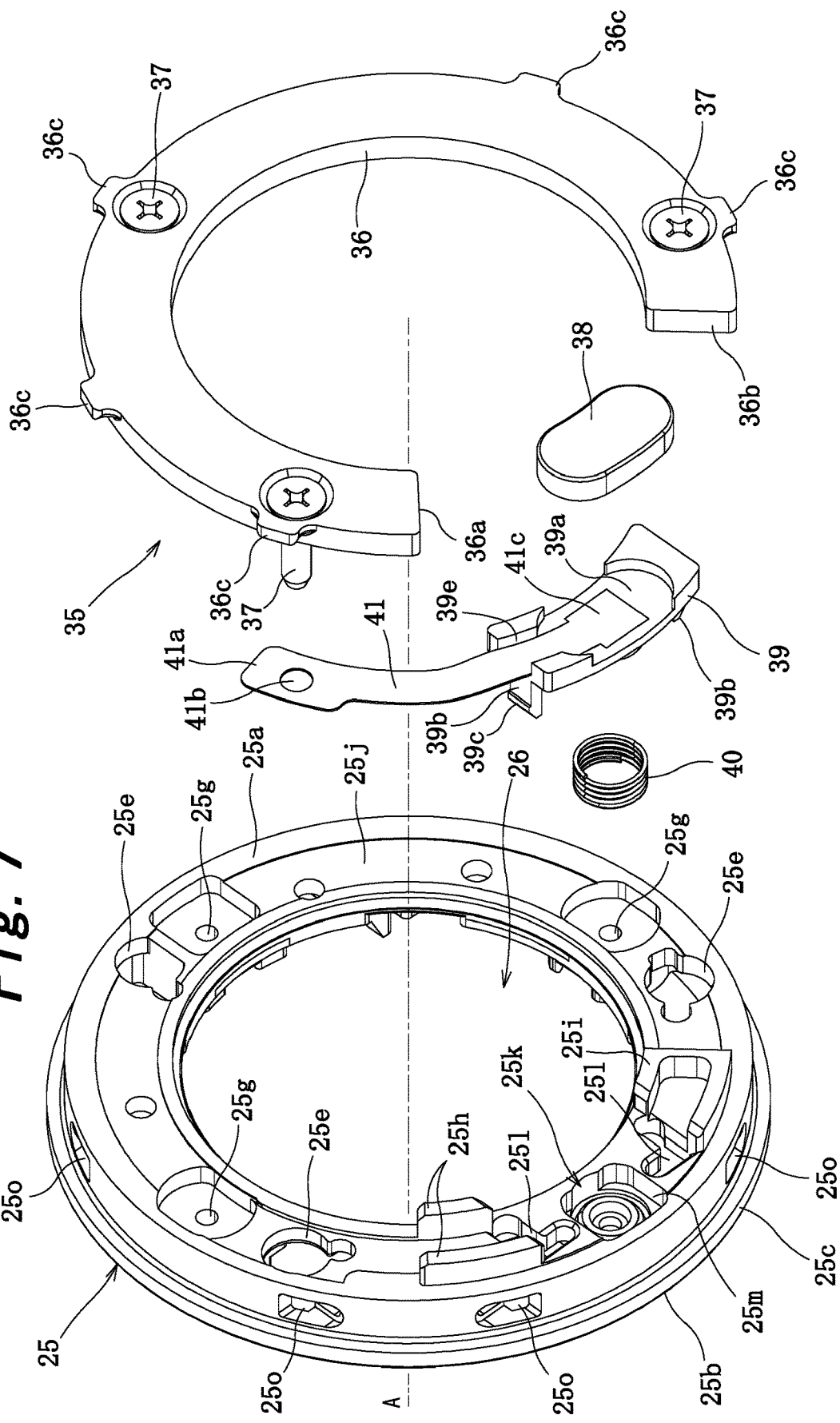
FIG. 7 is an exploded perspective view of the rotor, the first transmission member, and the second transmission member as viewed from the rear.

Referring to FIG. 2A, the rotor 25 is provided with an insertion hole 25*e* for allowing the knob 30 to move along the axis A. Referring to FIG. 6, on a side of the second end 25*b* of the rotor 25, an arrangement portion 25*f* in which the energizing member 33 is arranged and a recess 25*n* in which a stabilizer 55 described later is arranged are provided. Referring to FIG. 7, positioning ribs 25*h* and 25*i* that support the first transmission member 36 and a mounting portion 25*k* on which the second transmission member 38 is mounted are provided on a side of the first end 25*a* of the rotor 25. These will be described in detail later.

As shown in FIGS. 3 and 5, the knob 30 is an annular cover around the axis A having an opening 31 that communicates with the opening 21 and allows part of the display panel 1 to be visually recognized. The knob 30 is made from insulating resin (for example, PC/ABS). The knob 30 is arranged on a side of the second end 25*b* of the rotor 25 in such a manner that relative movement in the direction along the axis A with respect to the rotor 25 is allowed and relative movement in the circumferential direction around the axis A with respect to the rotor 25 is restricted.

Specifically, as shown in FIGS. 2A and 5, the knob 30 has a conical inner wall portion 30*a* defining the opening 31 and a conical cylindrical outer wall portion 30*b* surrounding the outer side of the inner wall portion 30*a*. The inner wall portion 30*a* is arranged in the openings 21 and 26 of the holder 21 and the rotor 25 so as to be located on the innermost side. The outer wall portion 30*b* is arranged on the outside of the holder 20 so as to be located on the outermost side. These have a concentric cylindrical shape around the axis A.

An end on the vehicle inner side in the inner wall portion 30*a* and the outer wall portion 30*b* is blocked by an end wall portion 30*c* connected to these. An end on the vehicle outer side in the inner wall portion 30*a* and the outer wall portion 30*b* is an opening portion 30*d*. That is, on the end wall portion 30*c* connected to the outer wall portion 30*b*, the opening 31 through which part of the display panel 1 can be visually recognized through the opening 21 is formed, and the inner wall portion 30*a* is continuously provided at the edge of the opening 31.

The inner wall portion 30*a* and the outer wall portion 30*b* are inclined so as to be separated from each other from the end wall portion 30*c* toward the opening portion 30*d*. The diameter of the outer end of the inner wall portion 30*a* located on the opening portion 30*d* side is smaller than the inner diameter of the rotor 25, and the outer end of the inner wall portion 30*a* protrudes to the vehicle outer side further than the rotor 25. The diameter of the outer end of the outer wall portion 30*b* located on the opening portion 30*d* side is larger than the outer diameter of the holder 20, and the outer end of the outer wall portion 30*b* protrudes to the vehicle outer side further than the rotor 25. Most of the holder 20 and the rotor 25 are housed inside the inner wall portion 30*a*, the outer wall portion 30*b*, and the end wall portion 30*c*.

Next, referring to FIGS. 2A and 5, the end wall portion 30*c* is provided with a cylindrical boss (connecting portion) 30*e* that penetrates the rotor 25 and projects to the opening portion 30*d* side (vehicle outer side). A plurality of the bosses 30*e* (three in the present embodiment) are provided at intervals in the circumferential direction on the end wall portion 30*c*. The total length of the boss 30*e* from the end on the end wall portion 30*c* side to the end on the opening portion 30*d* side is longer than the thickness of the rotor 25 from the second end 25*b* to the first end 25*a* and shorter than the total length of the inner wall portion 30*a*.

As shown in FIGS. 2A and 7, the rotor 25 is provided with the insertion holes 25*e* corresponding to each of a plurality of the bosses 30*e*. Referring to FIG. 6, the vehicle inner side of the insertion hole 25*e* spatially communicates with the recess 25*n* in which the stabilizer 55 is arranged. The insertion hole 25*e* is larger than the outer diameter of the boss 30*e*, allows the boss 30*e* to be inserted, and allows the boss 30*e* to move in the direction along the axis A. This allows the knob 30 to move relative to the rotor 25 in the direction along the axis A. Further, when the boss 30*e* abuts on the hole wall of the insertion hole 25*e*, the relative movement of the knob 30 with respect to the rotor 25 is restricted in the circumferential direction around the axis A.

Figure 9:
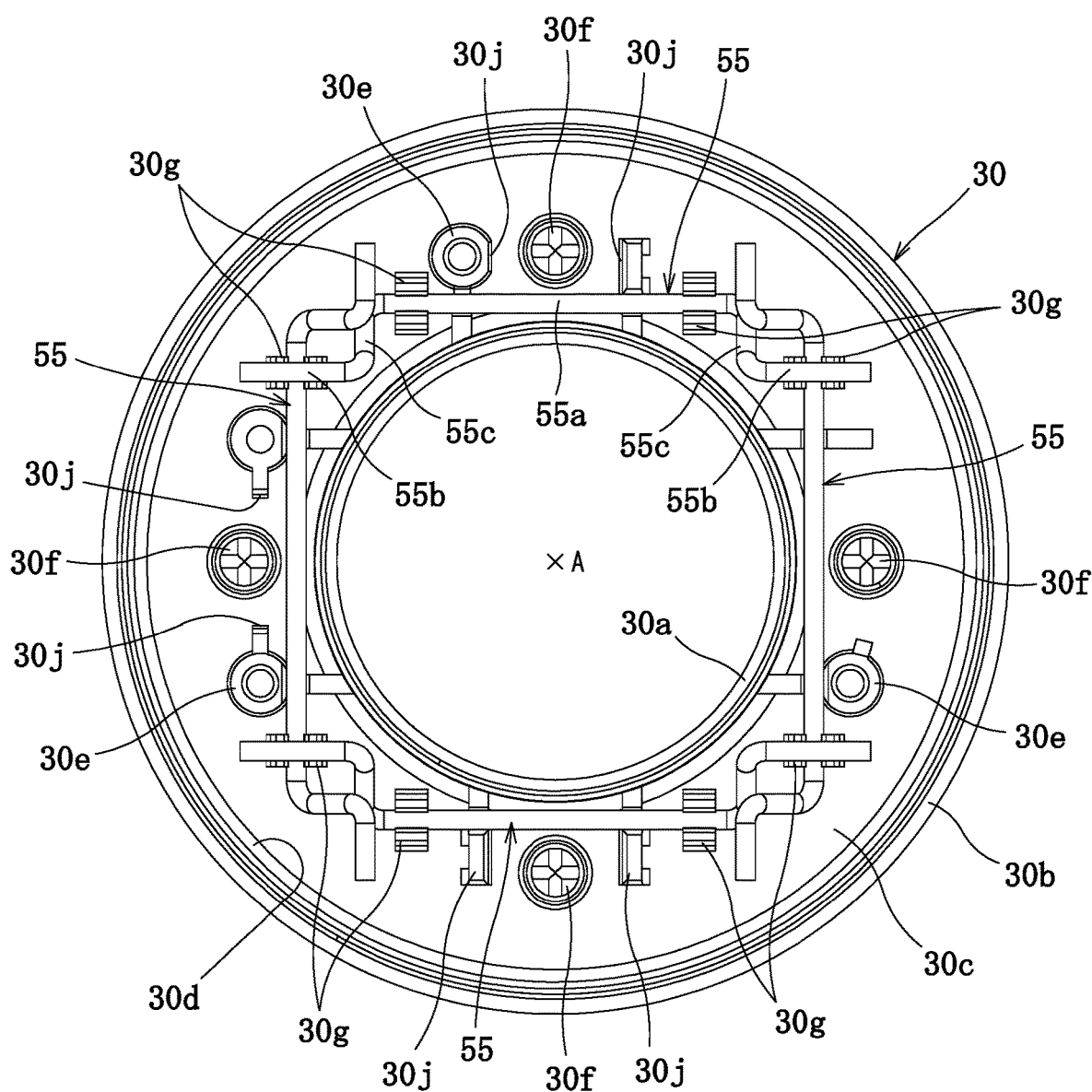
FIG. 9 is a front view illustrating the arrangement of the stabilizer with respect to the knob.

Referring to FIG. 9, the knob 30 is further provided with a restricting portion 30*j* having functions of guiding the movement of the rotor 25 in the direction along the axis A and restricting the movement of the rotor 25 in the circumferential direction around the axis A. The restricting portion 30*j* formed on the lower side in FIG. 9 is composed of a pair of ribs having a function of supporting the stabilizer 55, and a block 25*r* having the arrangement portion 25*f* shown in FIG. 6 is sandwiched between them. The restricting portion 30*j* formed on the left side in FIG. 9 is composed of a pair of ribs having a cylindrical shape and protruding from a pair of the bosses 30*e*, and the block 25*r* having the arrangement portion 25*f* shown in FIG. 6 is sandwiched between them. The restricting portion 30*j* formed on the upper side in FIG. 9 is composed of a pair of ribs having a function of supporting the stabilizer 55 and an outer peripheral portion of the boss 30*e*, and the block 25*r* having the arrangement portion 25*f* shown in FIG. 6 is sandwiched between them.

As shown in FIGS. 2A and 2B, the energizing member 33 is arranged between the rotor 25 and the knob 30 and energizes the knob 30 in the direction away from the rotor 25 along the axis A. The energizing member 33 is made from elastic rubber (for example, silicone rubber) and is formed in a substantially conical cylindrical shape. However, the energizing member 33 may be a coil spring or a leaf spring, or may be a resin spring having a raised structure provided in the rotor 25.

Specifically, as shown in FIGS. 5 and 6, a plurality (four in the present embodiment) of the energizing members 33 are arranged at equal intervals in the circumferential direction on a side of the second end 25b of the rotor 25. Each of the energizing members 33 includes an annular base 33a, a protrusion 33b protruding from the base 33a in a conical cylindrical shape, and a columnar head 33c provided at the tip of the protrusion 33b.

The second end 25b of the rotor 25 is provided with the arrangement portion 25f in which the energizing member 33 is arranged. The arrangement portion 25f is formed of a recess having a circular cross section on which the base 33a can be arranged, and is provided at an angle position different from that of the insertion hole 25e. The depth of the arrangement portion 25f in the direction in which the axis A extends is smaller than the total height of the energizing member 33, and the head 33c of the energizing member 33 projects from the second end 25b toward the knob 30 side. The bottom of the arrangement portion 25f is provided with a through hole 25g that penetrates to the first end 25a. The through hole 25g allows the flow of air due to the elastic deformation of the energizing member 33 shown in FIGS. 2A and 2B. A holding portion 30f for holding the head 33c of the energizing member 33 is provided on the inner surface of the end wall portion 30c of the knob 30.

As shown in FIGS. 2A and 5, the first transmission member (first conductive portion) 36 and the second transmission member (second conductive portion) 38 constituting the transmission member 35 are connected conductively by a connecting member (connecting portion) 41 having flexibility and conductivity. The first transmission member 36 and the second transmission member 38 are arranged between the inner wall portion 30a and the outer wall portion 30b, and between the rotor 25 and the film 50 on the first end 25a side. The first transmission member 36 is attached to the knob 30, and the second transmission member 38 is attached to the rotor 25. By the push operation of the knob 30, the first transmission member 36 moves along the axis A in conjunction, while the second transmission member 38 does not move. By the rotation operation of the knob 30, the first transmission member 36 is integrally rotated, and the second transmission member 38 is integrally rotated via the rotor 25. That is, the first transmission member 36 moves relative to the second transmission member 38 along the axis A, and does not move relative to the second transmission member 38 in the circumferential direction around the axis A.

As shown in FIGS. 5 and 7, the first transmission member 36 is a C-shaped plate made from conductive metal (for example, brass). However, the first transmission member 36 may be made from rubber or resin as long as the material has conductivity. The angle from a first end 36a to a second end 36b of the first transmission member 36 in the circumferential direction is approximately 270 degrees. The radial width of the first transmission member 36 is narrower than the radial width of the rotor 25.

As shown in FIG. 2A, the first transmission member 36 is connected to the boss 30e by a screw (connecting member) 37. By tightening the screw 37 penetrating the through hole of the first transmission member 36 to the boss 30e, the knob 30 and the first transmission member 36 are maintained in the mounted state with respect to the rotor 25. Further, a plurality of (five in this embodiment) protrusions 36c are provided on the outer peripheral portion of the first transmission member 36 so as to project outward in the radial direction and abut on the vehicle outer side end surface of the holding portion 20a.

With the knob 30 in the non-operated state, the first transmission member 36 retracts to a position close to the first end 25a of the rotor 25 when the protrusion 36c abuts on the holding portion 20a due to the energization of the energizing member 33. Further, the abutment of the protrusion 36c on the holding portion 20a restricts the further movement toward the vehicle inner side of the knob 30, the rotor 25, and the first transmission member 36. As shown in FIG. 2B, the push operation of the knob 30 causes the first transmission member 36 to advance to a position in contact with the film 50 along the axis A.

Referring to FIG. 7, the first end 25a of the rotor 25 is provided with the positioning ribs 25h and 25i that assist in arranging the first transmission member 36 with respect to the rotor 25. A pair of the first positioning ribs 25h are provided so as to extend in the circumferential direction. The second positioning rib 25i is provided so as to project substantially in a U shape. Between a pair of the positioning ribs 25h and 25i, a recessed groove 25j recessed from the vehicle outer side to the vehicle inner side is provided in a portion where the first transmission member 36 is arranged.

As shown in FIGS. 5 and 7, the second transmission member 38 is an elliptical columnar plate made from conductive metal (for example, brass). However, the second transmission member 38 may be made from rubber or resin as long as the material has conductivity.

The second transmission member 38 is arranged between both the ends 36a and 36b so as to be located on a concentric circle with the first transmission member 36. The second transmission member 38 is arranged at the first end 25a of the rotor 25 with a holding member 39 interposed between them, and is energized to the vehicle outer side by a spring 40. As shown in FIG. 2A, with the knob 30 in the non-operated state, the second transmission member 38 protrudes further than the first transmission member 36 with respect to the first end 25a and abuts on the film 50.

Figure 8:
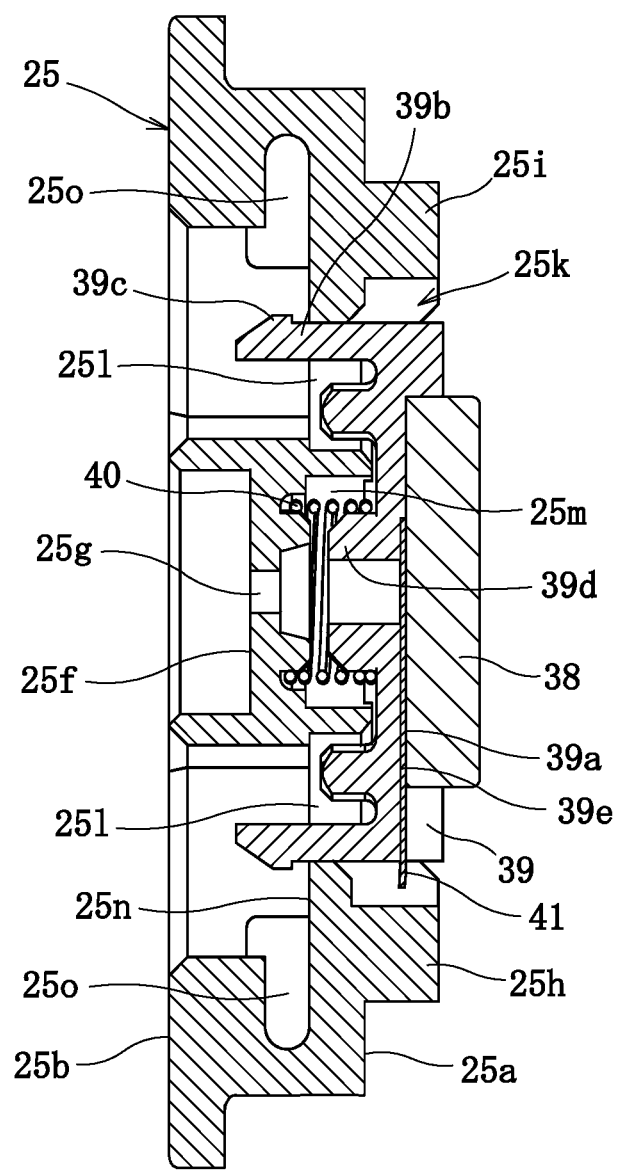
FIG. 8 is a cross-sectional view illustrating an arrangement structure of the second transmission member.

As shown in FIGS. 7 and 8, the holding member 39 includes an elliptical columnar recess 39a corresponding to the shape of the second transmission member 38. The depth of the recess 39a in the direction in which the axis A extends is smaller than the thickness of the second transmission member 38, and the second transmission member 38 protrudes from the end face of the holding member 39. The holding member 39 is provided with a pair of locking pieces 39b protruding to the vehicle inner side. The locking piece 39b includes a claw portion 39c for preventing separation from the rotor 25. A projection 39d at which one end of the spring 40 is arranged is provided in the center on the vehicle inner side of the holding member 39.

Next, referring to FIGS. 7 and 8, the first end 25a of the rotor 25 is provided with the mounting portion 25k on which the holding member 39 is mounted. The mounting portion 25k is provided adjacent to the vehicle outer side of one of a plurality of the arrangement portions 25f. The mounting portion 25k includes a pair of through holes 25l through which the locking piece 39b penetrates, and a recess 25m in which the spring 40 is arranged. Each of the through holes 25l is provided adjacent to the positioning ribs 25h and 25i. The vehicle inner side of the through hole 25l spatially communicates with the recess 25n in which the stabilizer 55 is arranged. The recess 25m is provided between a pair of the through holes 251 so as to be recessed from the vehicle outer side to the vehicle inner side. A gap that allows movement in the direction along the axis A of the holding member 39 with respect to the rotor 25 is secured between the edge of the through hole 251 located on a side of the second end 25b and the claw portion 39c.

As shown in FIGS. 5 and 7, the connecting member 41 is mechanically connected to the first transmission member 36 and the second transmission member 38. The connecting member 41 is composed of a conductive film which is electrically conductive resin, and conductively connects the first transmission member 36 and the second transmission member 38. The connecting member 41 is formed in an arc shape having a curvature extending concentrically with the first transmission member 36.

At one end of the connecting member 41, a first connection end 41a connected to the first transmission member 36 is provided. The first connection end 41a includes a through hole 41b through which the screw 37 can be inserted. The screw 37 located at the end of the first transmission member 36 is allowed to pass through the through hole 41b, and the screw 37 is tightened to a boss 30e through an insertion hole 25e adjacent to a mounting portion 25k. In this manner, the first connection end 41a is sandwiched between the first transmission member 36 and the boss 30e, and the conductivity between the connection member 41 and the first transmission member 36 is secured.

At the other end of the connecting member 41, a rectangular second connection end 41c that is connected to the second transmission member 38 is provided. At one end of the holding member 39 in the circumferential direction, an insertion groove 39e communicating with a recess 39a is provided. After the second connection end 41c is arranged in the recess 39a through the insertion groove 39e, the second transmission member 38 is arranged in the recess 39a. In this manner, the second connection end 41c is sandwiched between the second transmission member 38 and the holding member 39, and the conductivity between the connection member 41 and the second transmission member 38 is secured.

The connecting member 41 is flexible and can be deformed by the relative movement of the first transmission member 36 with respect to the second transmission member 38. Specifically, the dimension of the connecting member 41 is set so that a redundant (allowable) portion that protrudes from between the first transmission member 36 and the second transmission member 38 can be secured with the knob 30 in the non-operated state shown in FIG. 2A. By this redundant portion, the connecting member 41 allows relative movement of the first transmission member 36 with respect to the second transmission member 38.

As shown in FIGS. 3 and 4, the ring member 45 includes an opening 46 that communicates with the openings 21 and 31 to expose part of the display panel 1, and is an annular cylinder around the axis A. The ring member 45 is made from insulating resin (for example, ABS). The ring member 45 is arranged between a hole wall (inner peripheral surface) of the opening 26 of the rotor 25 and the inner wall portion 30a, that is, inside the rotor 25 and outside the inner wall portion 30a.

The ring member 45 includes a base 45a fixed to the inner peripheral portion of the film 50, and a protrusion 45b protruding into the knob 30 from the outer peripheral portion of the base 45a. The tip of the protrusion 45b located on the vehicle inner side is located closer to the end wall portion 30c side than the opening portion 30d of the knob 30 with the knob 30 in the non-operated state shown in FIG. 2A.

Next, referring to FIGS. 3 and 4, the film 50 is an annular member around the axis A and includes an opening 51 that exposes part of the display panel 1. The film 50 is made from resin (for example, PET) having excellent insulation, water resistance, and heat resistance. The film 50 has a thickness smaller than the minimum wall thickness of a resin molded product that can be manufactured by injection molding. Specifically, the thickness of the film 50 is preferably 0.05 mm or more and 0.2 mm or less, and is 0.1 mm in the present embodiment. The film 50 is fixed to the vehicle outer side end faces of the holder 20 and the ring member 45, and covers the display panel 1 side of the first transmission member 36 and the second transmission member 38.

The outer diameter of the film 50 is the same as the outer diameter of the maximum portion of the holder 20, and the inner diameter of the film 50 is the same as the inner diameter of the minimum portion of the ring member 45. Referring to FIG. 2A as well, in the film 50, the adhesive layer 52a is provided on the surface on the vehicle outer side facing the display panel 1. On the surface on the vehicle inner side of the film 50, an adhesive layer 52b for fixing the holder 20 is provided on the outer peripheral portion, and an adhesive layer 52c for fixing the ring member 45 is provided on the inner peripheral portion.

As shown in FIGS. 5 and 6, the operation knob device 10 includes the stabilizer 55 that suppresses the inclination of the knob 30 with respect to the rotor 25 during the push operation. A plurality of the stabilizers 55 are arranged between the rotor 25 and the end wall portion 30c of the knob 30. In the present embodiment, four of the stabilizers 55 are arranged at 90-degree intervals in the circumferential direction around the axis A.

Each of the stabilizers 55 includes a base portion 55a, a pair of slide portions 55b, and a pair of arm portions 55c and is formed of a wire.

As shown in FIG. 9, the base portion 55a is arranged adjacent to the radial outer side of the inner wall portion 30a. The base portions 55a of the stabilizers 55 adjacent to each other extend in the orthogonal directions.

The base portion 55a is rotatably held by a holding portion 30g projecting from the end wall portion 30c. The holding portion 30g is provided so as to be located near both ends in the longitudinal direction of the base portion 55a, is located on both sides of the base portion 55a, and includes a pair of claw portions for holding the base portion 55a.

The slide portion 55b is continuous with the base portion 55a with the arm portion 55c interposed between them and extends parallel to the base portion 55a. When viewed from the direction in which the axis A extends, the base portion 55a and the slide portion 55b of the stabilizers 55 adjacent to each other intersect in the orthogonal direction. That is, the base portion 55a of the first stabilizer 55 and the slide portion 55b of the second stabilizer 55 adjacent to the first stabilizer 55 intersect.

As shown in FIGS. 5 and 6, the slide portion 55b is arranged in the recess 25n formed at the second end 25b of the rotor 25, and is held by a slide groove 25o formed in the outer peripheral portion of the rotor 25.

The recesses 25n are provided at four locations at angular positions different from the insertion hole 25e and the arrangement portion 25f. The recess 25n has a bottom surface that is recessed from the vehicle inner side to the vehicle outer side and allows the slide portion 55b to move. The forming region of the recess 25n, the forming region of the insertion hole 25e, and the forming region of the through hole 251 spatially communicate with each other.

The slide groove 25o is an elongated hole that spatially communicates with the recess 25n and penetrates from the recess 25n to the outer peripheral surface of the rotor 25. A total of eight of the slide grooves 25o are provided, two in each of the recesses 25n. A pair of the slide grooves 25o formed in one of the recesses 25n extend in the orthogonal directions, and a different one of the slide portions 55b of the stabilizer 55 is arranged in each. By arranging the tip of the slide portion 55b in the slide groove 25o, the slide portion 55b is allowed to move along the second end 25b.

As shown in FIGS. 6 and 9, the arm portion 55c is continuous with the outer end of the base portion 55a and the inner end of the slide portion 55b. The arm portion 55c extends in a direction orthogonal to the base portion 55a and the slide portion 55b. As described above, since the base portion 55a is held by the knob 30 and the slide portion 55b is held by the rotor 25, the arm portion 55c is inclined with respect to the bottom surface of the recess 25n. Due to this inclination, the arm portions 55c of the stabilizers 55 adjacent to each other are arranged three-dimensionally without interference.

Note that the rotor 25 may be provided with a holding portion for holding the base portion 55a, and the knob 30 may be provided with a slide groove for holding the slide portion 55b.

Next, the operation of the operation knob device 10 will be described.

As shown in FIG. 2A, with the knob 30 in the non-operated state, the knob 30 is held at a position separated from the rotor 25 by the energization of the energizing member 33. In this manner, the first transmission member 36 connected to the boss 30e is located away from the film 50. Further, the second transmission member 38 is held at a position abutting on the film 50 by the energization of the spring 40.

In this non-operated state, in the display panel 1, the capacitance of a portion facing the first transmission member 36 does not change, and only the capacitance of a portion facing the second transmission member 38 changes. However, the position where the capacitance is changed by the second transmission member 38 is maintained at a predetermined position. Therefore, the display panel 1 can detect that the knob 30 is not operated.

When the knob 30 is pushed, the knob 30 approaches the rotor 25 against the energizing force of the energizing member 33. At this time, the base portion 55a of the stabilizer 55 is pressed by the linear motion of the knob 30, and the slide portion 55b moves along the bottom surface of the recess 25n and the slide groove 25o. In this manner, the inclination of the knob 30 with respect to the rotor 25 is suppressed. Further, the linear motion of the knob 30 causes the first transmission member 36 to approach or come into contact with the film 50 with the boss 30e interposed between them.

By the push operation, the capacitance of the display panel 1 changes not only in the portion facing the second transmission member 38 but also in the portion facing the first transmission member 36. Therefore, the area where the capacitance of the display panel 1 changes is wider than that in the non-operated state. By the increase in the change area of the capacitance, the display panel 1 can detect the push operation of the knob 30.

When the push operation is stopped, the energizing force of the energizing member 33 causes the knob 30 and the first transmission member 36 to move to the vehicle inner side with respect to the rotor 25. In this manner, in the display panel 1, the change in the capacitance of the portion facing the first transmission member 36 no longer occurs, so that the area where the capacitance changes becomes local as compared with that in the push operation state. By the decrease in the change area of the capacitance, the display panel 1 can detect release of the push operation of the knob 30.

When the knob 30 is rotated, the second transmission member 38 rotates together with the rotor 25 interposed between them. At this time, since the knob 30 is held away from the rotor 25 by the energizing member 33, the first transmission member 36 is also kept away from the film 50.

Due to the rotation operation, in the display panel 1, the capacitance of the portion facing the first transmission member 36 does not change, and only the capacitance of the portion facing the second transmission member 38 changes, where the changing position rotates around the axis A. Therefore, the display panel 1 can detect the rotation operation of the knob 30, including the direction in which the knob 30 rotates (clockwise or counterclockwise).

When the rotation operation is stopped, the rotation of the rotor 25 and the second transmission member 38 is also stopped. In this manner, on the display panel 1, the movement of the position where the capacitance changes is stopped. Therefore, the display panel 1 can detect the stoppage of the rotation operation of the knob 30.

The operation knob device 10 of the first embodiment configured as described above has the features described below.

Since the first transmission member 36 and the second transmission member 38 are conductively connected by the connecting member 41, their capacitance can be made large. Specifically, when the display panel 1 detects the first transmission member 36, the capacitance of the first transmission member 36 is added with the capacitance of the second transmission member 38. Further, when the display panel 1 detects the second transmission member 38, the capacitance of the second transmission member 38 is added with the capacitance of the first transmission member 36.

In this manner, it is not necessary to make the shape (volume corresponding to the capacitance) of the individual transmission members 36 and 38 excessively large, so that the transmission members 36 and 38 can be reduced in size. Further, since the capacitance of the transmission members 36 and 38 can be made large, the detectability of the display panel 1, that is, the transmissibility of the knob operation can be improved.

Further, for example, the configuration of increasing the capacitance in the operation knob device of Patent Literature 1, that is, the configuration in which a knob made from a conductive material is electrically connected to the first transmission member and the second transmission member and the changing capacitance is increased by a human body coming into contact with the knob is not necessary. Not only that, for example, even if the user wears a glove made from an insulating material, the display panel 1 can detect the operation of the knob 30 by the transmission members 36 and 38.

The connecting member 41 connecting the first transmission member 36 and the second transmission member 38 has flexibility. Therefore, the relative movement of the first transmission member 36 and the second transmission member 38, that is, the forward and backward movement of the first transmission member 36 with respect to the second transmission member 38 can be realized with a simple configuration. Further, the first transmission member 36 and the second transmission member 38 are made from metal having a larger capacitance than that of conductive rubber or resin. Therefore, the capacitance of the transmission members 36 and 38 can be easily secured.

Compared to a wall of a resin molded product by injection molding, the film 50 is thin and easily conducts electric charges. Accordingly, the capacitance of the display panel 1 that changes depending on the conductive first transmission member 36 or second transmission member 38 can be increased. Therefore, in this respect as well, the detectability of the display panel 1, that is, the transmissibility of the knob operation can be improved.

Since the first transmission member 36 and the second transmission member 38 do not come into contact with the display panel 1 due to the film 50, damage to the display panel 1 due to the operation of the knob 30 can be prevented. Moreover, when the knob 30 is pushed, the sound caused by the collision of the first transmission member 36 with the display panel 1 can be reduced.

Second Embodiment

Figure 10:
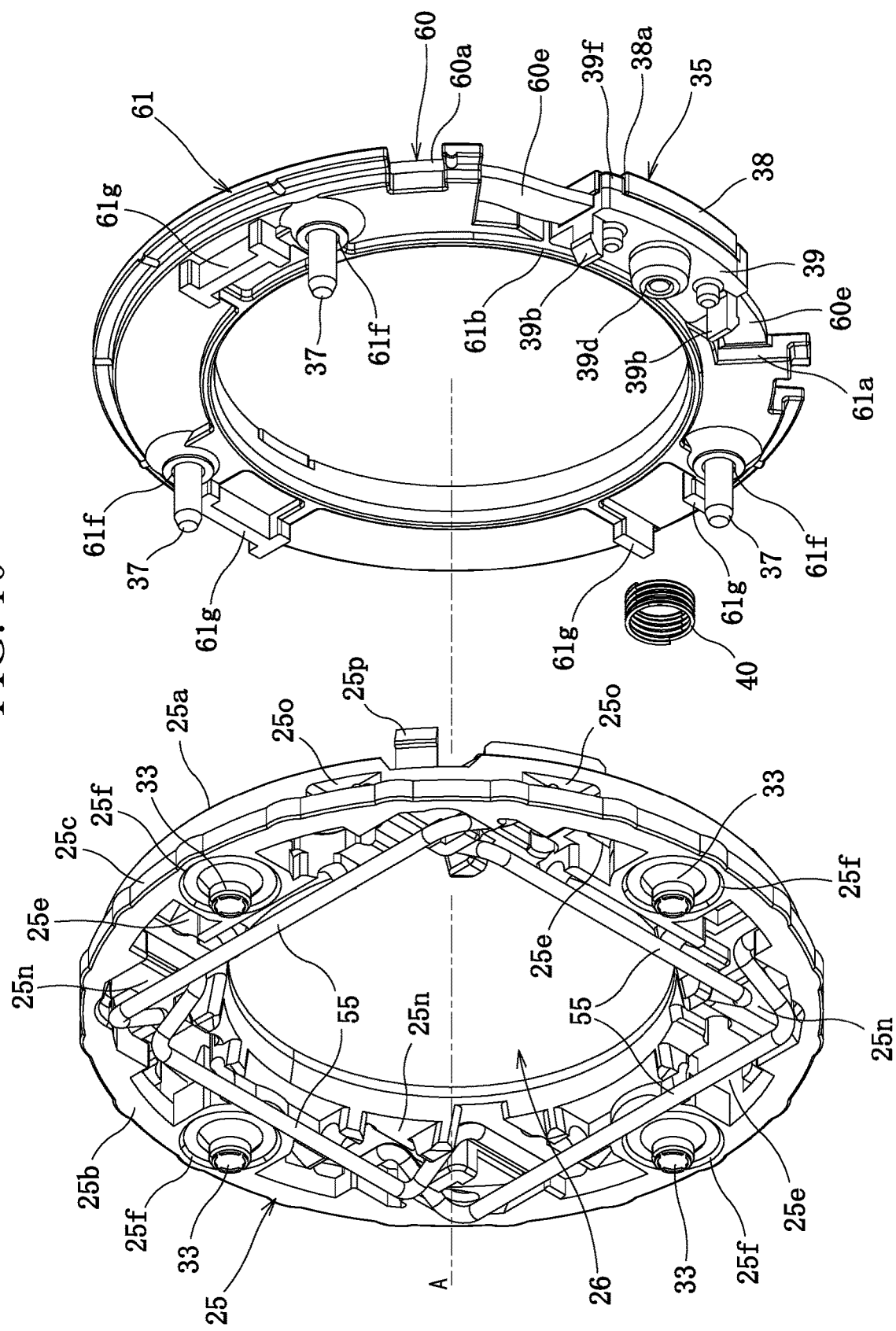
FIG. 10 is an exploded perspective view showing the rotor, the first transmission member, and the second transmission member of the operation knob device of the second embodiment.
Figure 11:
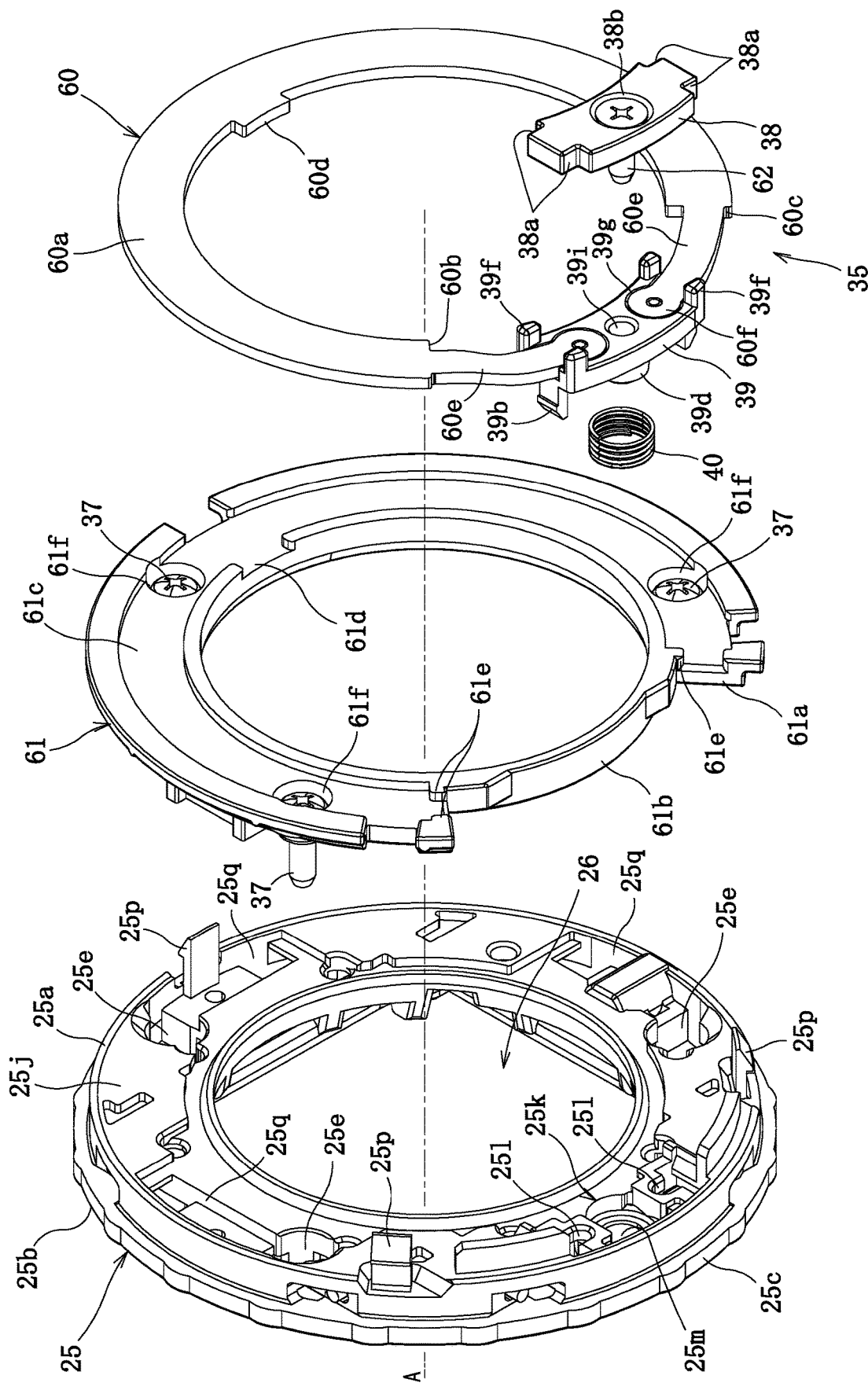
FIG. 11 is an exploded perspective view of the rotor, the first transmission member, an attachment member, the second transmission member, and a holding member of FIG. 10 as viewed from the rear.

FIGS. 10 and 11 show the rotor 25 and the transmission member 35 used in the operation knob device of a second embodiment. The configurations of the holder, knob, energizing member, ring member, and film (not shown) are the same as those of the first embodiment.

The second embodiment is different from the first embodiment in that a first transmission member (first transmission portion 60a) 60 constituting the transmission member 35 is made from conductive rubber, and the first transmission member 60 is provided with a connecting portion 60e in an integral structure. Further, in the second embodiment, in order to attach the first transmission member 60 made from rubber to the knob 30, an attachment member 61 made from insulating resin (for example, nylon) is provided.

As shown in FIGS. 10 and 11, the first end 25a of the rotor 25 of the second embodiment is provided with a locking piece 25p that is locked to the holding portion 20a of the holder 20 shown in FIG. 2A and restricts movement of the rotor 25 to the vehicle inner side along the axis A. Further, the recessed groove 25j of the rotor 25 is provided with a through hole 25q corresponding to the restricting portion 30j. A plurality (three in the present embodiment) of the through holes 25q are provided in the circumferential direction around the axis A.

As shown in FIG. 11, the first transmission member 60 integrally includes the first transmission portion 60a for transmitting push operation and a pair of the connecting portions 60e for conductively connecting the second transmission member 38. The first transmission member 60 is made from conductive rubber. However, the first transmission member 60 may be made from resin as long as the material is conductive and flexible.

The first transmission portion 60a is a C-shaped plate when viewed from the direction along the axis A, and the angle from a first end 60b to a second end 60c is approximately 270 degrees. The width of the first transmission portion 60a in the radial direction and the thickness of the first transmission portion 60a in the direction along the axis A are preferably large as much as possible in order to make the capacitance large. In the present embodiment, the width is 5 mm and the thickness is 1 mm in consideration of productivity.

The first transmission portion 60a is attached to the attachment member 61 by an attaching means. As the attaching means, a method using an adhesive member such as double-sided tape and an adhesive, or a method using a mechanical structure such as press-fitting and a fixed piece can be used. A positioning protrusion 60d protrudes from the inner peripheral portion of the first transmission portion 60a so as to be located at the center in the circumferential direction from the first end 60c to the second end 60c.

The connecting portion 60e protrudes from the first end 60b and the second end 60c of the first transmission portion 60a. The width of the connecting portion 60e in the radial direction is smaller than the width of the first transmission portion 60a in the radial direction. In this manner, the elastic deformation of the first transmission portion 60a is suppressed, while the elastic deformation of the connecting portion 60e connected to the first transmission portion 60a is allowed. In the present embodiment, the thickness of the connecting portion 60e in the direction along the axis A is the same as the thickness of the first transmission portion 60a. However, in order to promote elastic deformation of the connecting portion 60e, the thickness of the connecting portion 60e may be smaller than the thickness of the first transmission portion 60a.

Each of tips of a pair of the connecting portions 60e is provided with a connection end 60f to be conductively connected to the second transmission member 38. The connection end 60f has a circular shape when viewed from the direction in which the axis A extends, and has the diameter larger than the width of the connecting portion 60e. At the center of the connection end 60f, a through hole 60g penetrating in the thickness direction is provided. The dimension of the length from the ends 60b and 60c of the first transmission portion 60a to the connection end 60f is set so that a redundant portion can be secured between the first transmission portion 60a and the second transmission member 38 with the knob in the non-operated state.

As shown in FIGS. 10 and 11, the attachment member 61 is a substantially annular plate having a notch portion 61a in a portion where a pair of the connecting portions 60e and the second transmission member 38 are arranged. The diameter and radial width of the attachment member 61 are such sizes that the attachment member 61 is fitted into the recessed groove 25j of the rotor 25. The notch portion 61a is notched in a fan shape from the outside to the inside in the radial direction. The radial inside of the notch portion 61a is a continuous portion 61b left without being notched. That is, the inner peripheral portion of the attachment member 61 is continuous in an annular shape.

Referring to FIG. 11, in the attachment member 61, a recessed groove 61c in which the first transmission portion 60a is arranged is provided in a portion other than the notch portion 61a in the circumferential direction. A positioning groove 61d corresponding to the positioning protrusion 60d of the first transmission portion 60a is formed at the center of the recessed groove 61c in the circumferential direction. A pair of locking portions 61e to be locked to the first end 60b and the second end 60c of the first transmission portion 60a are provided at both ends of the recessed groove 61c. The space between a pair of the locking portions 61e is a groove through which the connecting portion 60e is inserted.

The attachment member 61 is provided with a penetration portion 61f through which the screw 37 tightened to the boss 30e of the knob 30 shown in FIG. 2A is allowed to pass. Referring to FIG. 10, the attachment member 61 is provided with a positioning projection 61g which protrudes from the vehicle outer side to the vehicle inner side and is arranged between the restricting portions 30j which penetrate the through hole 25q so as to be adjacent to the penetration portion 61f. The positioning projection 61g restricts the relative movement (rotation) of the attachment member 61 about the axis A with respect to the knob 30. Of three of the positioning projections 61g, two are composed of ribs that project in an H shape when viewed from the direction along the axis A, and the remaining one is composed of a pair of ribs which are plates that project at intervals in the circumferential direction.

As shown in FIGS. 10 and 11, the second transmission member 38 is formed separately from the first transmission member 60, and is integrated with the first transmission member 60 with the holding member 39 interposed between them. Like in the first embodiment, the second transmission member 38 is a plate made from conductive metal (for example, brass). However, the second transmission member 38 may be made from rubber or resin as long as the material has conductivity.

The second transmission member 38 of the second embodiment has a fan shape. At the four corners of the second transmission member 38, notch portions 38a for positioning which are notched to form a rectangular shape are provided. A penetration portion 38b through which a screw 62 is allowed to pass is provided at the center of the second transmission member 38.

Figure 12:
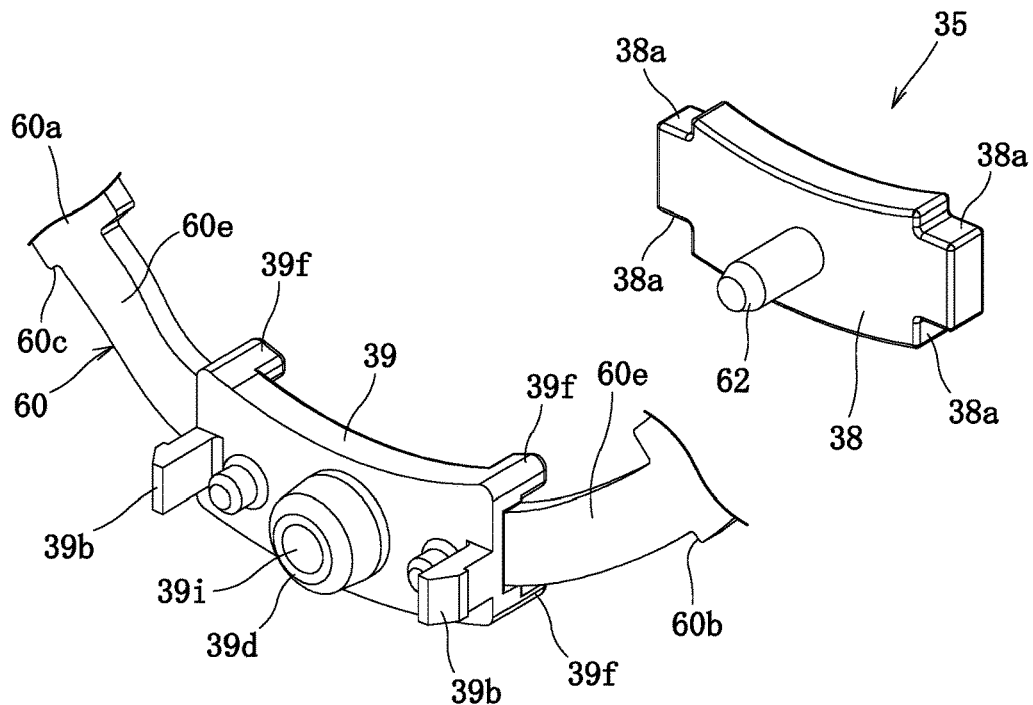
FIG. 12 is an exploded perspective view of the first transmission member, the second transmission member, and the holding member of FIG. 10.
Figure 13:
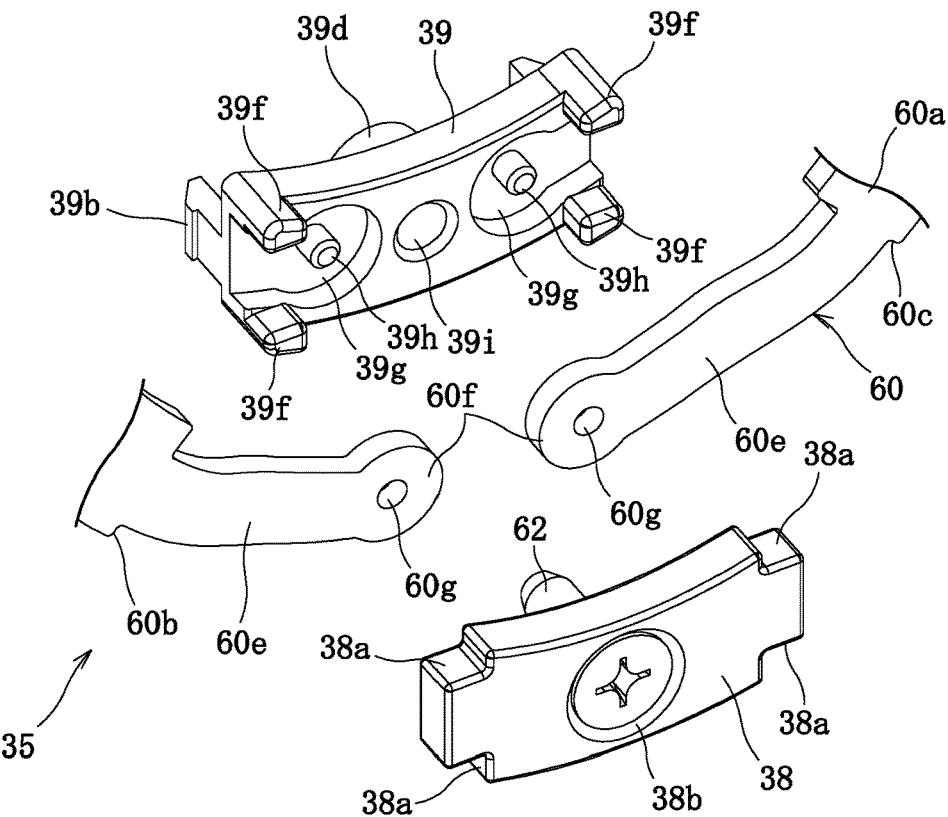
FIG. 13 is an exploded perspective view of the first transmission member, the second transmission member, and the holding member of FIG. 10 as viewed from the rear.

As shown in FIGS. 12 and 13, the holding member 39 of the second embodiment is a fan-shaped plate corresponding to the shape of the second transmission member 38. At the four corners of the holding member 39, projections 39f for positioning located in the notch portions 38a are provided. Like in the first embodiment, the projection 39d at which one end of the spring 40 is arranged is provided in the center on the vehicle inner side of the holding member 39.

A pair of recesses 39g in which the tips of a pair of the connecting portions 60e are each arranged are provided on the vehicle outer side of the holding member 39. The recess 39g includes a circular portion in which the connection end 60f is arranged and a rectangular portion in which the vicinity of the connection end 60f is arranged in the connecting portion 60e. The depth of the recess 39g is smaller than the thickness of the connecting portion 60e, and the connecting portion 60e is configured to protrude from the vehicle outer side end surface of the holding member 39. The recess 39g is provided with a columnar protrusion 39h that penetrates the through hole 60g. The protrusion dimension of the protrusion 39h is smaller than the depth of the recess 39g.

A screw hole 39i for tightening the screw 62 is provided between a pair of the recesses 39g. The screw hole 39i is provided coaxially with the axis of the cylindrical projection 39d. After the connecting portion 60e is arranged in the recess 39g, the second transmission member 38 is arranged on the outside of the connecting portion 60e, and the screw 62 penetrating the penetration portion 38b is tightened in the screw hole 39i. In this manner, the connecting portion 60e is sandwiched between the second transmission member 38 and the holding member 39 in a pressure contact state, so that the conductivity between the first transmission member 60 and the second transmission member 38 is secured.

The operation of the operation knob device of the second embodiment configured as described above is the same as that of the operation knob device of the first embodiment.

With the knob in the non-operated state (see FIG. 2A), the first transmission portion 60a is located away from the film with the attachment member 61 interposed between them. Further, the second transmission member 38 is held at a position abutting on the film by the energization of the spring 40. Accordingly, in the display panel, the capacitance of a portion facing the first transmission portion 60a does not change, and only the capacitance of a portion facing the second transmission member 38 changes. However, since the position where the capacitance is changed by the second transmission member 38 is maintained at a predetermined position, the display panel can detect that the knob is not operated.

When the knob is pushed (see FIG. 2B), the linear motion of the knob causes the first transmission portion 60a to approach or come into contact with the film integrally with the attachment member 61. Therefore, the capacitance of the display panel changes not only in the portion facing the second transmission member 38 but also in the portion facing the first transmission portion 60a. Accordingly, the display panel can detect the push operation of the knob. When the push operation of the knob is stopped, the energizing force of the energizing member causes the first transmission portion 60a to move to the vehicle inner side integrally with the attachment member 61. Therefore, since the area where the capacitance of the display panel changes is reduced, the display panel can detect the release of the push operation of the knob.

When the knob is rotated, the first transmission member 60 and the second transmission member 38 rotate together with the rotor 25. Further, the first transmission portion 60a is maintained in a state separated from the film, and the second transmission member 38 is maintained in a state of being located in the vicinity of the film by the spring 40. Although the capacitance of the display panel changes only in the portion facing the second transmission member 38, since the changing position rotates around the axis A, the display panel can detect the rotation operation of the knob. When the rotation operation is stopped, the rotation of the rotor 25 and the second transmission member 38 is also stopped, so that the display panel can detect the stoppage of the rotation operation of the knob.

The operation knob device of the second embodiment configured as described above can obtain the same action and effect as those of the first embodiment. That is, since the first transmission portion 60a and the second transmission member 38 are conductively connected by the connecting portion 60e, their capacitance can be made large. Therefore, it is not necessary to make the shape of the individual transmission members 60 and 38 excessively large, so that the transmission members 60 and 38 can be reduced in size. Further, since the capacitance of the transmission members 60 and 38 can be made large, the detectability of the display panel, that is, the transmissibility of the knob operation can be improved.

The first transmission member 60 (first transmission portion 60a) is made from rubber, the second transmission member 38 is made from metal, and the connecting portion 60e is configured integrally with the first transmission portion 60a. Since the first transmission portion 60a that comes into contact with and separated from the display panel is made from elastic rubber, it is possible to reduce the sound caused by the collision of the first transmission portion 60a with the display panel when the knob is pushed. Further, since the second transmission member 38 that does not collide with the display panel is made from metal having a larger capacitance than conductive rubber, the capacitance of the transmission member 35 is secured, and then the collision sound of the first transmission portion 60a can be effectively reduced.

Even in a case where the knob 30 is inclined during the push operation and the first transmission portion 60a comes into contact with the display panel 1 in a slightly inclined state, the inclination of the knob 30 can be absorbed by the elastic deformation of the first transmission portion 60a formed of rubber. Therefore, the contact area of the first transmission portion 60a with respect to the display panel 1 can be made large. In this manner, the detectability of the first transmission portion 60a by the display panel can be improved.

Third Embodiment

Figure 14:
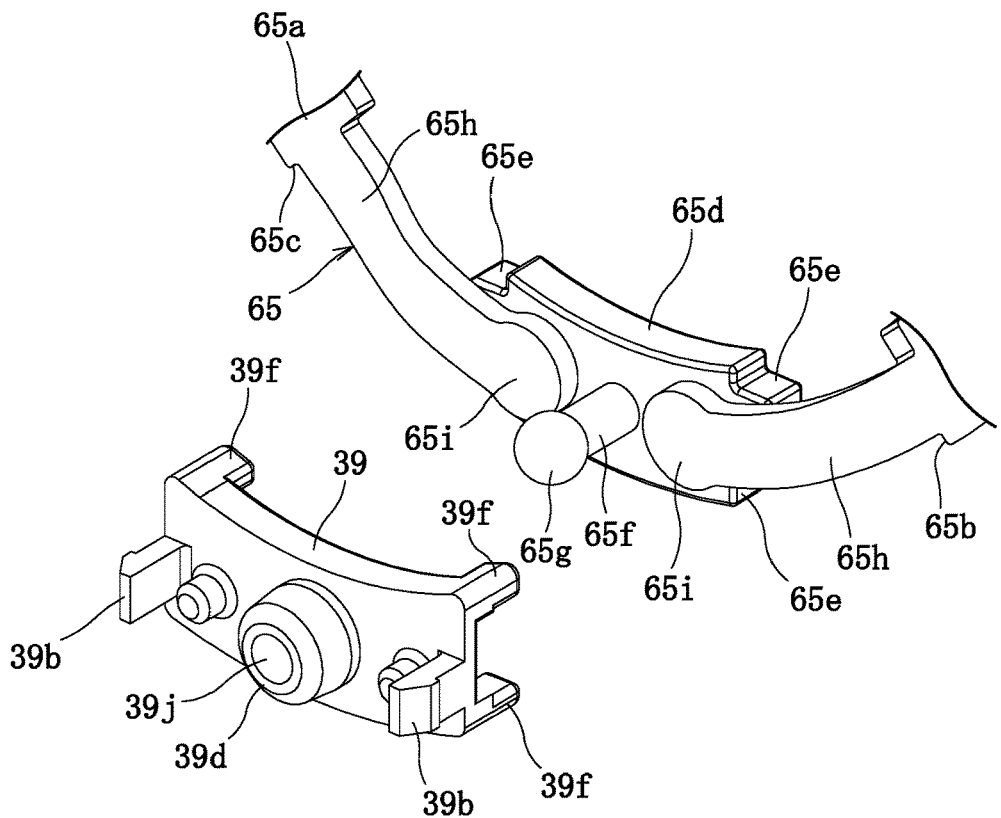
FIG. 14 is an exploded perspective view of the first transmission member, the second transmission member, and the holding member of the operation knob device of a third embodiment.
Figure 15:
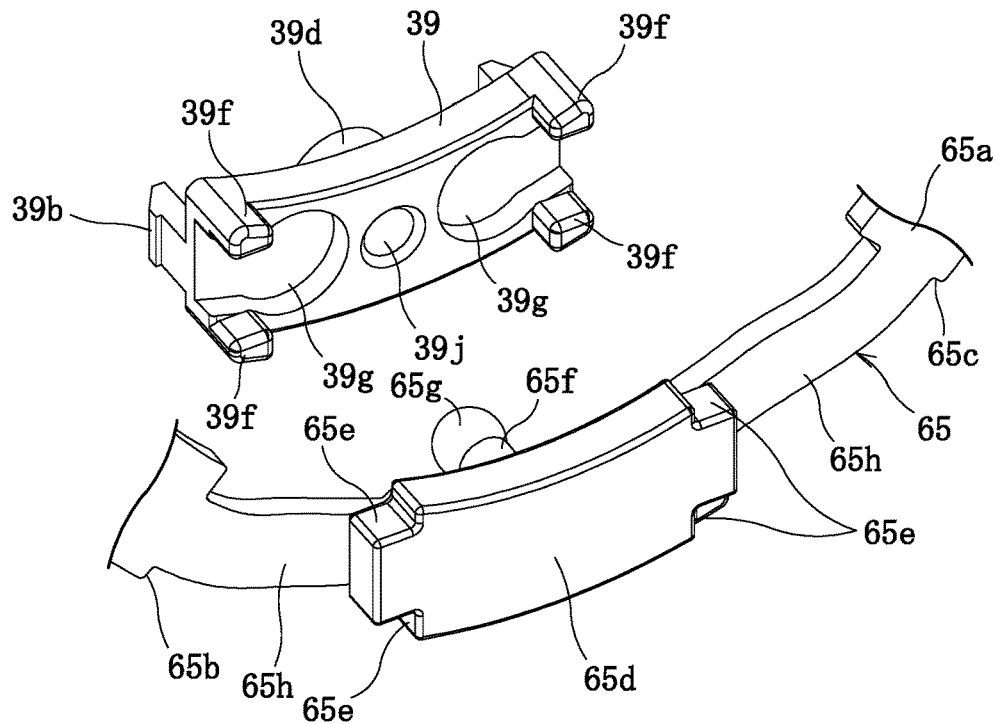
FIG. 15 is an exploded perspective view of the first transmission member, the second transmission member, and the holding member of FIG. 14 as viewed from the rear.

FIGS. 14 and 15 illustrate a transmission member 65 of the operation knob device of a third embodiment. The configurations other than the transmission member 65, that is, the configurations of the holder, knob, energizing member, ring member, and film are the same as those of the first embodiment, and the configurations of the rotor and the attachment member are the same as those of the second embodiment.

As shown in FIGS. 14 and 15, the transmission member 65 includes, in an integrated structure, a first transmission portion 65a for transmitting push operation, a second transmission portion 65d for transmitting rotation operation, and a connecting portion 65h for conductively connecting these. The transmission member 65 is made from conductive rubber. However, the transmission member 65 may be made from resin as long as the material is conductive and flexible.

The first transmission portion 65a is a C-shaped plate when viewed from the direction along the axis A, and the angle from a first end 65b to a second end 65c is approximately 270 degrees. A positioning protrusion (see FIG. 11) protrudes from the inner peripheral portion of the first transmission portion 65a so as to be located at the center in the circumferential direction from the first end 65b to the second end 65c.

The second transmission portion 65d is a fan-shaped plate, and provided with notch portions 65e for positioning which are notched to form a rectangular shape at the four corners. A shaft portion 65f protruding to the vehicle inner side is provided at the center of the second transmission portion 65d, and a spherical press-fitting portion 65g is provided at the tip of the shaft portion 65f.

The connecting portion 65h protrudes from the first end 65b and the second end 65c of the first transmission portion 65a. The tips of a pair of the connecting portions 65h are circular connection ends 65i, which are connected to the surface on the vehicle inner side of the second transmission portion 65d so as to be located on both sides of the shaft portion 65f. That is, the connection end 65i is connected to the second transmission portion 65d and protrudes from the second transmission portion 65d to the vehicle inner side. The dimension of the length from the ends 65b and 65c of the first transmission portion 65a to the connection end 65i is set so that a redundant portion can be secured between the first transmission portion 65a and the second transmission portion 65d with the knob in the non-operated state.

The holding member 39 is a fan-shaped plate corresponding to the shape of the second transmission portion 65d, and includes the projection 39f corresponding to the notch portion 65e. The holding member 39 is provided with the projection 39d and the recess 39g as in the second embodiment. However, the recess 39g of the third embodiment is not provided with the protrusion 39h of the second embodiment shown in FIG. 13. Further, the holding member 39 is provided with an attachment hole 39j which is smaller than the diameter of the press-fitting portion 65g and to which the press-fitting portion 65g can be press-fit, instead of the screw hole 39i of the second embodiment.

The transmission member 65 of the operation knob device of the third embodiment configured as described above can obtain the same action and effect as those of the second embodiment. Moreover, since the first transmission portion 65a, the second transmission portion 65d, and the connecting portion 65h are made from rubber and configured integrally, the number of parts can be reduced and the weight can be reduced. Further, the sound caused by the collision of the first transmission portion 65a with the display panel when the knob is pushed can be effectively reduced.

Note that the operation knob device 10 of the present invention is not limited to the configuration of the above embodiment, and various changes can be made.

For example, the first transmission portion, the second transmission portion, and the connecting portion constituting the transmission member are not limited to the configurations shown in the first to third embodiments, and can be changed as needed. In particular, the connecting portion may be provided separately from the second transmission portion and integrally with the first transmission portion as in the second embodiment, or may be provided separately from the first transmission portion and integrally with the second transmission portion.

In the above embodiment, the end of the cylindrical holder 20 is covered with the film 50. However, the end may be covered by a partition wall integrally provided with the holder 20 and the partition wall may be interposed between the display panel 1 and the transmission member 65. Even in this way, since the first transmission portion and the second transmission portion are connected by the conductive connecting portion and the capacitance of the transmission member is made large, the detectability of the display panel 1, that is, the transmissibility of the operation knob device can be secured. Further, in a case where the first transmission portion 60a is formed of conductive rubber, the sound caused by the collision of the first transmission portion 60a with the display panel 1 can be reduced. For this reason, the film 50 may be eliminated.

The operation knob device 10 of the present invention can be used for a product other than in-vehicle products as long as the product is mounted with the display panel 1 having a touch detection function.

What is claimed is:
1. An operation knob device comprising:
a holder having an annular holding portion and arranged adjacent to a display panel so that an axis of the holding portion intersect with the display panel;
a rotor that has a first end facing the display panel and a second end located on a side opposite to the display panel with respect to the first end, and is arranged in the holding portion so as to allow rotation around the axis;
a knob arranged on a side of the second end of the rotor so that relative movement in a direction along the axis with respect to the rotor is allowed and relative movement in a circumferential direction around the axis with respect to the rotor is restricted; and
a conductive transmission member arranged on a side of the first end of the rotor, wherein
the transmission member has
a first transmission portion that moves along the axis in conjunction with the knob,
a second transmission portion that is attached to the first end so as to rotate integrally with the rotor and projects further than the first transmission portion with respect to the first end with the knob in a non-operated state, and
a connecting portion that conductively connects the first transmission portion and the second transmission portion.

2. The operation knob device according to claim 1, wherein the connecting portion has flexibility.

3. The operation knob device according to claim 2, wherein
the knob has a connection portion that penetrates the rotor and projects toward the first end side, and
the first transmission portion is attached to the connection portion and is movable relative to the second transmission portion along the axis.

4. The operation knob device according to claim 1, wherein
the first transmission portion and the second transmission portion are made from metal, and
the connecting portion is made from a conductive film.

5. The operation knob device according to claim 2, wherein
the first transmission portion and the second transmission portion are made from metal, and
the connecting portion is made from a conductive film.

6. The operation knob device according to claim 3, wherein
the first transmission portion and the second transmission portion are made from metal, and
the connecting portion is made from a conductive film.

7. The operation knob device according to claim 1, wherein
the first transmission portion is made from rubber, and the second transmission portion is made from metal, and
the connecting portion is configured integrally with the first transmission portion.

8. The operation knob device according to claim 2, wherein
the first transmission portion is made from rubber, and the second transmission portion is made from metal, and
the connecting portion is configured integrally with the first transmission portion.

9. The operation knob device according to claim 3, wherein
the first transmission portion is made from rubber, and the second transmission portion is made from metal, and
the connecting portion is configured integrally with the first transmission portion.

10. The operation knob device according to claim 1, wherein the first transmission portion, the second transmission portion, and the connecting portion are made from rubber and configured integrally.

11. The operation knob device according to claim 2, wherein the first transmission portion, the second transmission portion, and the connecting portion are made from rubber and configured integrally.

12. The operation knob device according to claim 3, wherein the first transmission portion, the second transmission portion, and the connecting portion are made from rubber and configured integrally.

* * * * *